(12) United States Patent
Delaney et al.

(10) Patent No.: US 6,937,574 B1
(45) Date of Patent: Aug. 30, 2005

(54) VIRTUAL PRIVATE NETWORKS AND METHODS FOR THEIR OPERATION

(75) Inventors: David MacDonald Delaney, Ottawa (CA); Peter Martin Kenneth Cottreau, Ashton (CA); Alan James Hurren, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/270,733

(22) Filed: Mar. 16, 1999

(51) Int. Cl.$^7$ .......................... H04L 12/28; H04L 12/56
(52) U.S. Cl. ..................................... 370/254; 370/401
(58) Field of Search ................................ 370/254, 389, 370/395.1, 395.53, 395.54, 395.3, 395.31, 400, 401, 392

(56) References Cited

U.S. PATENT DOCUMENTS

| | | | |
|---|---|---|---|
| 4,627,052 A | | 12/1986 | Hoare et al. ................. 370/402 |
| 5,394,402 A | * | 2/1995 | Ross .......................... 370/402 |
| 5,684,800 A | * | 11/1997 | Dobbins et al. ............. 370/401 |
| 5,862,338 A | * | 1/1999 | Walker et al. ............... 709/224 |
| 5,978,378 A | * | 11/1999 | Van Seters et al. ......... 370/401 |
| 6,041,057 A | * | 3/2000 | Stone ......................... 370/397 |
| 6,085,238 A | * | 7/2000 | Yuasa et al. ................. 370/409 |
| 6,151,324 A | * | 11/2000 | Belser et al. ................ 370/397 |
| 6,185,214 B1 | * | 2/2001 | Schwartz et al. ........... 370/401 |
| 6,205,488 B1 | * | 3/2001 | Casey et al. ................. 709/238 |
| 6,414,958 B1 | * | 7/2002 | Specht ................... 370/395.53 |
| 6,512,766 B2 | * | 1/2003 | Wilford ....................... 370/389 |

FOREIGN PATENT DOCUMENTS

| | | | | |
|---|---|---|---|---|
| WO | WO 95 01023 A | 1/1995 | ........... | H04L/12/18 |
| WO | WO 99/00948 A | 1/1999 | ........... | H04L/12/56 |

OTHER PUBLICATIONS

Lee, Haeryong et al (Aug. 2000). End–to–End QoS Architecture for VPNs: MPLS VPN Deployment in a Backbone Network, Proceedings of the International Workshops on Parallel Processing, pp. 479–483.*

Downey, T; "Overview of Tag Switching", Electronics Industries Forum of New England, 1997, Professional Program Proceedings Boston, MA, USA May 6–8, 1997, New York, NY, USA, IEEE, US, pp. 61–66, XP010234255, ISBN: 0–7803–3987–8.

* cited by examiner

Primary Examiner—Frank Duong
Assistant Examiner—Kevin C. Harper

(57) ABSTRACT

In methods and apparatus for routing packets through a communications network, a respective distinct broadcast address is assigned to each of a plurality of distinct sets of virtual ports. No virtual port belongs to more than one of the distinct sets. A respective egress address is assigned to each packet entering the network via an ingress virtual port. The respective egress address corresponds to a respective destination address of the entering packet when a correspondence between the destination address and an egress address is known. When no correspondence between the destination address and an egress address is known, the respective egress address is a broadcast egress address corresponding to the set comprising the ingress virtual port. The packet is routed according to the respective egress address. The routing is restricted to virtual ports belonging to the distinct set of virtual ports that includes the ingress virtual port. The distinct sets of virtual ports and their associated broadcast addresses define isolated virtual private networks within the network. Each physical port of the network may map one-to-one onto a corresponding virtual port, or may map onto a corresponding plurality of virtual ports, in which case the each virtual port of the plurality is associated with a respective distinct combination of a physical address of the physical port and a respective virtual network identifier.

56 Claims, 10 Drawing Sheets

US 6,937,574 B1

VIRTUAL PRIVATE NETWORKS AND METHODS FOR THEIR OPERATION

FIELD OF INVENTION

This invention relates to Virtual Private Networks (VPNs) and to methods for their operation. More particularly this invention relates to methods and apparatus that enable Network Service Providers (NSPs) to provide virtual private LAN interconnect services to large groups of customers.

BACKGROUND OF INVENTION

Most large businesses operate LANs at several sites to meet their data communications needs. The businesses lease dedicated circuits from NSPs to connect their LANs into Wide Area Networks (WANs). Because distinct customers of the NSP lease distinct dedicated circuits, their WANs are isolated from another, thereby meeting data security requirements.

The dedicated circuits are available in fixed bandwidths (e.g. DS1, DS3). Customers must lease a dedicated circuit that meets their maximum bandwidth requirements. Because typical data traffic is bursty, whereas the dedicated circuits provide a fixed bandwidth at all times, the dedicated circuits are frequently operating below capacity. Consequently, customers typically pay for more dedicated circuit capacity than they would need if the NSP's network capacity could be shared more efficiently among customers while preserving the required isolation between networks of distinct customers.

The IEEE 802.1 standard defines a protocol that enables an Ethernet LAN to be partitioned into multiple Virtual LANs (VLANs), each VLAN being isolated from the other VLANs. Large businesses typically use the IEEE 802.1 protocol to partition their LANs into VLANs for distinct interest groups within the business.

The IEEE 802.1 standard requires that a header of each frame of data carry a VLAN tag that identifies the VLAN for which the data frame is intended. Switches (or "bridges") of the LAN read the header and route the data frames to only those ports which, according to routing tables (or "filter databases") stored at the switches, are participating in that VLAN. The 12 bit capacity of the VLAN tag specified by the IEEE 802.1 standard limits the number of distinct VLANs to 4095. NSPs need to support many more than 4095 distinct customers on a shared network.

SUMMARY OF INVENTION

In this specification, the terms "switch", "switching element", "router" and "routing device" are intended to include any device providing switching or routing functionality including, but not limited to, switches and routers.

This invention seeks to provide methods and apparatus that enable a NSP to provide a very large number of VLANs on shared network facilities.

Embodiments of the invention may use extensions to Ethernet protocols so that existing Ethernet technology and familiarity with Ethernet in the data communications industry can be leveraged to provide VLAN capability for a large number of customers at low acquisition cost and low operating cost.

One aspect of the invention provides a method of routing packets through a communications network having a plurality of distinct sets of virtual ports. No virtual port belongs to more than one of the distinct sets. In the network, each distinct set of virtual ports is assigned a respective distinct broadcast address. The method comprises assigning a respective egress address to each packet entering the network via an ingress virtual port. The respective egress address corresponds to a respective destination address of the entering packet when a correspondence between the destination address and an egress address is known. When no correspondence between the destination address and an egress address is known, the respective egress address is a broadcast egress address corresponding to the set comprising the ingress virtual port. The method further comprises routing the packet according to the respective egress address. The routing is restricted to virtual ports belonging to the distinct set of virtual ports which includes the ingress virtual port.

The distinct sets of virtual ports and their associated distinct broadcast addresses define isolated virtual private networks within the network. Because the number of different broadcast addresses is much greater than the number of different VLAN identifiers permitted under the IEEE 802.1 standard, the communications network can provide a larger number of isolated virtual private networks than can a standard IEEE 802.1 VLAN network.

Each physical port of the network may map one-to-one onto a corresponding virtual port, or may map onto a corresponding plurality of virtual ports. In the case that a physical port maps onto a plurality of virtual ports, each virtual port of the plurality is associated with a respective distinct combination of a physical address of the physical port and a respective virtual network identifier.

The invention enables network providers and their multiple customers to ensure that data cannot be sent between virtual ports belonging to different distinct sets of virtual ports. Consequently, data sent into a network of virtual ports via one of the virtual ports (the ingress virtual port for that data) can exit the network only at a virtual port (the egress virtual port for that data) belonging to the same distinct set as the ingress port. This property allows the network providers and their multiple customers to ensure that communications between customers can occur only in controlled ways.

This property of the invention may be exploited by arranging that each distinct set of virtual ports is in the control of a single organization. In the case that one and only one virtual port maps to one physical port, the physical port is further arranged to be in the control of the organization that controls the virtual port.

If each virtual port of a particular distinct set of virtual ports is thus mapped to a distinct a physical port, and if no other virtual ports are mapped to those physical ports, than an organization that controls all the virtual ports of the particular set of virtual ports can be assured that only data that originates at one or more of its physical ports can be received at any of its physical ports.

In the case that multiple organizations have elected to trust a service provider to respect their security requirements, multiple virtual ports, each belonging to a different distinct set of virtual ports belonging to a different organization, can be mapped to a physical port belonging to the trusted service provider. The trusted service provider is thereby enabled to communicate with multiple customers through a single physical port, a much more economical arrangement than requiring the service provider to have a separate physical port for each customer.

When the destination address of the packet is a unicast address and a correspondence between the destination address and a unicast egress address is known, the step of assigning an egress address may comprise assigning the unicast egress address. The unicast egress address corresponds to an egress virtual port belonging to the distinct set of virtual ports which includes the ingress virtual port. The destination address is accessible from that egress virtual port. The step of routing the packet may comprise routing the packet to that egress virtual port.

When the destination address of the packet is a unicast address and no correspondence between the destination address and an egress address is known, the step of assigning an egress address may comprise assigning a broadcast egress address corresponding to the distinct set of virtual ports which includes the ingress virtual port. The step of routing the packet may comprise routing the packet to each virtual port, other than the ingress virtual port, of the distinct set of virtual ports which includes the ingress virtual port.

When the destination address of the packet is a multicast address, the step of assigning an egress address may comprise assigning a broadcast egress address corresponding to the distinct set of virtual ports which includes the ingress virtual port. The step of routing the packet may comprise routing the packet to each virtual port of the distinct set of virtual ports which includes the ingress virtual port, other than the ingress virtual port.

Alternatively, when the destination address of the packet is a multicast address and a correspondence between the destination address and a multicast egress address is known, the step of assigning an egress address may comprise assigning the multicast egress address. The multicast egress address corresponds to a plurality of virtual ports belonging to the distinct set of virtual ports which includes the ingress virtual port. The step of routing the packet may comprise routing the packet to each virtual port of the plurality of virtual ports belonging to the distinct set of virtual ports which includes the ingress virtual port.

The method may further comprise assigning a respective ingress address to each packet entering the network, the respective ingress address corresponding to a virtual port at which the packet enters the network. The assigned ingress addresses may be used to populate address association tables, and the address association tables may be used to determine correspondences between destination addresses and egress addresses.

The egress address assigned to a packet may be encapsulated in the packet at the ingress virtual port via which the packet enters the network, and may be removed from the encapsulated packet at an egress virtual port where the packet leaves the network.

A respective ingress address may also be assigned to each packet entering the network, the respective ingress address corresponding to the ingress virtual port via which the packet enters the network. The assigned ingress address may also be encapsulated in the packed as it enters the network. An address association table associated with each virtual port of the network may be maintained, each address association table mapping each of a plurality of egress addresses to at least one corresponding destination address. The address association tables may be used to determine correspondences between destination addresses and egress addresses. On receipt of a packet entering the network via an ingress virtual port, an entry is added to the address association table associated with the ingress virtual port when the address association table does not contain a source address of the packet in any destination address field of the address association table. The entry comprises the source address in a destination address field and the ingress address in a corresponding egress address field. On receipt of an encapsulated packet at a virtual port of the network, an entry is added to the address association table associated with said virtual port when the address association table does not contain a source address of the encapsulated packet in any destination address field of the address association table. The entry comprises the source address in a destination address field and the ingress address of the encapsulated packet in a corresponding egress address field.

The above procedures populate address association tables of the network in a manner that preserves isolation between the communications of distinct customers even though the facilities of the communications network are shared. Consequently, each customer has its own virtual private network provided by the shared facilities.

The routing of packets having broadcast egress addresses may be restricted to only those trunks of the network required to reach virtual ports in the distinct set of virtual ports corresponding to the broadcast egress address. This avoids unwarranted consumption of network resources.

Similarly, the routing of packets having multicast egress addresses may be restricted to only those trunks of network required to reach virtual ports in plurality of virtual ports within a distinct set of virtual ports, the plurality of virtual ports corresponding to the multicast egress address.

Another aspect of the invention provides a communications network comprising a plurality of distinct sets of virtual ports, at least one address assigner and at least one router. No virtual port belongs to more than one of the distinct sets, and each distinct set is assigned a respective distinct broadcast address. Each address assigner is operable to assign a respective egress address to each packet entering the network via an ingress virtual port. The respective egress address corresponds to a respective destination address of the entering packet when a correspondence between the destination address and an egress address is known. The respective egress address is a broadcast egress address corresponding to the set comprising the ingress virtual port when no correspondence between the destination address and an egress address is known. Each router is operable to route the packet according to the respective egress address. The routing is restricted to virtual ports belonging to the distinct set of virtual ports which includes the ingress virtual port.

As noted above, each physical port of the network may map one-to-one onto a corresponding virtual port, or may map onto a corresponding plurality of virtual ports. In the case that a physical port maps onto a plurality of virtual ports, each virtual port of the plurality is associated with a respective distinct combination of a physical address of the physical port and a respective virtual network identifier.

The network may further comprise a plurality of trunks interconnecting routers of the network. Each router is operable to route the packet via trunks of the network. When the packet is assigned a broadcast egress address corresponding to a distinct set of virtual ports, each router is operable to route the packet via a restricted set of trunks containing only those trunks required to reach virtual ports in the distinct set of virtual ports corresponding to said broadcast egress address. When the packet is assigned a multicast egress address corresponding to a plurality of virtual ports in a distinct set of virtual ports, each router is operable to route the packet via a restricted set of trunks containing only those trunks required to reach virtual ports in the plurality of virtual ports corresponding to said multicast egress address.

Yet another aspect of the invention provides is routing device for a communications network. The routing device comprises a plurality of distinct subsets of virtual ports, at least one address assigner and at least one router. No virtual port belongs to more than one of the distinct subsets. Each distinct subset may be a subset of a respective distinct set of virtual ports of the network. Each distinct set of virtual ports is assigned a respective distinct broadcast address. Each address assigner is operable to assign a respective egress address to each packet entering the network via an ingress virtual port of the routing device. The respective egress address corresponds to a respective destination address of the entering packet when a correspondence between the destination address and an egress address is known. The respective egress address is a broadcast egress address corresponding to the set comprising the ingress virtual port when no correspondence between the destination address and an egress address is known. Each router is operable to route the packet according to the respective egress address, the routing being restricted to virtual ports belonging to the distinct set of virtual ports which includes the ingress virtual port.

Each router may provide IEEE 802.1 switching functionality adapted to packets encapsulated with ingress and egress addresses.

A respective address assigner may be provided for each distinct subset of virtual ports. Each address assigner may be connected between its respective distinct subset of virtual ports and a router of the routing device. The routing device may further comprise a switching element connected between at least one address assigner and its respective distinct subset of virtual ports. The switching element may be operable to multiplex the virtual ports of the respective distinct subset of virtual ports onto the address assigner. The switching elements may provide IEEE 802.1 switching functionality.

Use of IEEE 802.1 switching functionality enables a NSP to provide transparent Ethernet LAN service across the NSP's network. Transparent Ethernet LAN service is attractive to many customers, as they are already familiar with the operation of Ethernet networks, Moreover, the use of many Ethernet conventions in the NSP network enable considerable re-use of proven and cost-effective Ethernet hardware and software in constructing the NSP network, and familiarity with the operation of Ethernet networks will facilitate operation of the shared network by the NSP.

The routing device may further comprise a VLAN demultiplexer connected between the router and a plurality of the address assigners. The VLAN demultiplexer is operable to route an encapsulated packet from the router to an address assigner selected according to the ingress address and the egress address of the encapsulated packet. The routing is such that all encapsulated packets having a common egress address and an ingress address corresponding to a virtual port in a particular set of the distinct sets of virtual ports are routed to an address assigner associated with that egress address and that particular distinct set of virtual ports.

Use of the VLAN demultiplexer permits some sharing of egress addresses among distinct virtual private networks without compromising the isolation between distinct virtual private networks. This capability is useful for connections between the network and external routers (e.g. Internet routers) where a respective dedicated link for each virtual private network is note economically feasible. Where the VLAN demultiplexer is used, a plurality of virtual ports may be connected to a common physical port of the routing device. Each such virtual port is associated with a unique combination of the physical address of the common physical port and a virtual network identifier.

Some translation of virtual private network identifiers may also be provided at interfaces to other networks supporting the virtual private networks.

BRIEF DESCRIPTION OF DRAWINGS

Embodiments of the invention are described below byway of example only. Reference is made to accompanying drawings, in which.

DETAILED DESCRIPTION OF EMBODIMENTS

Figure 1:
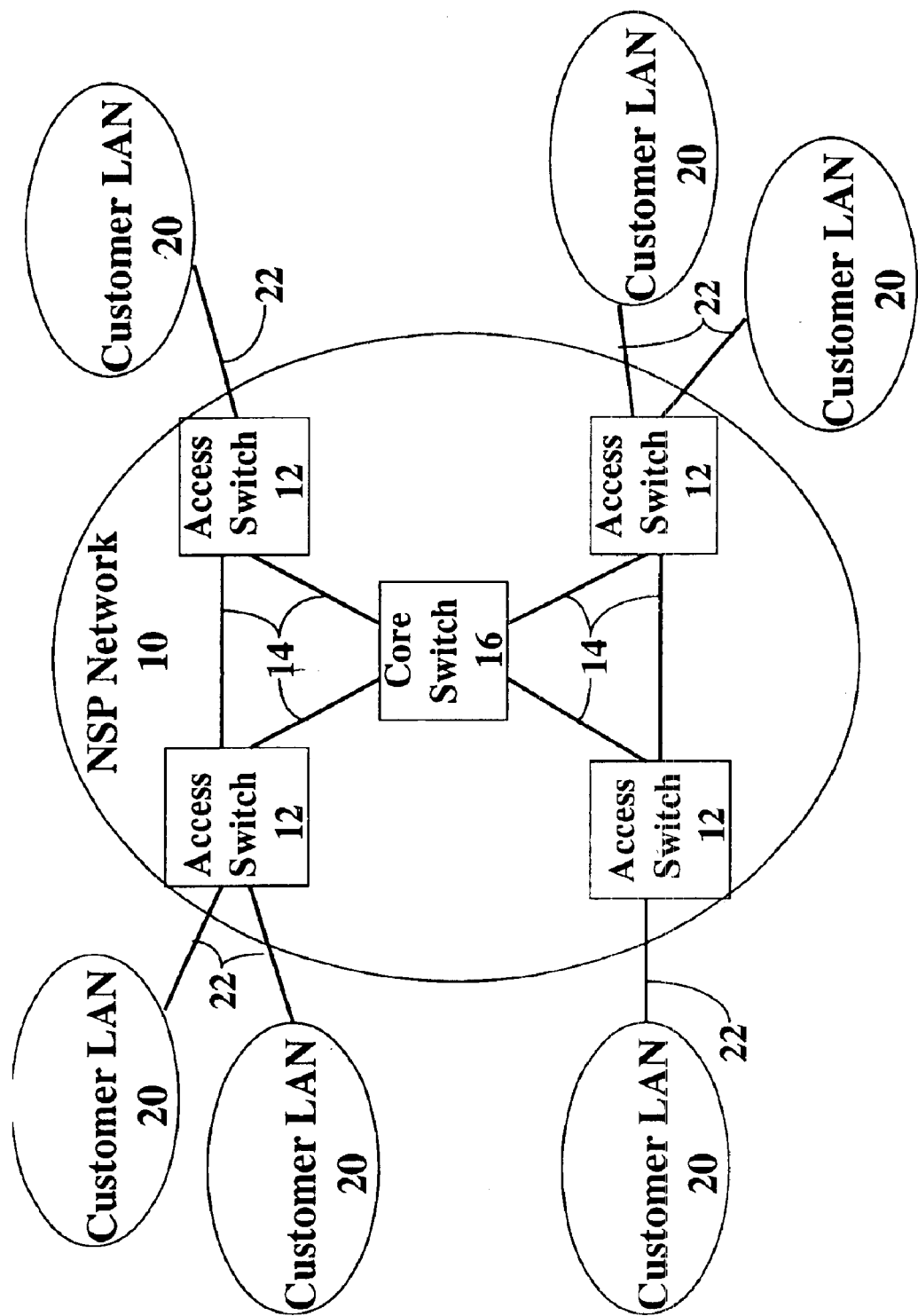
FIG. 1 is a block schematic diagram of a NSP network according to an embodiment of the invention.

FIG. 1 is a block schematic diagram of a NSP network 10 according to an embodiment of the invention. The NSP network 10 comprises a plurality of routing devices in the form of access switches 12 interconnected via transmission facilities 14. In some implementations, one or more core switches 16 may be connected between some of the access switches 12. The access switches 12 are each connected to one or more customer LANs 20 via respective access links 22.

Figure 2:
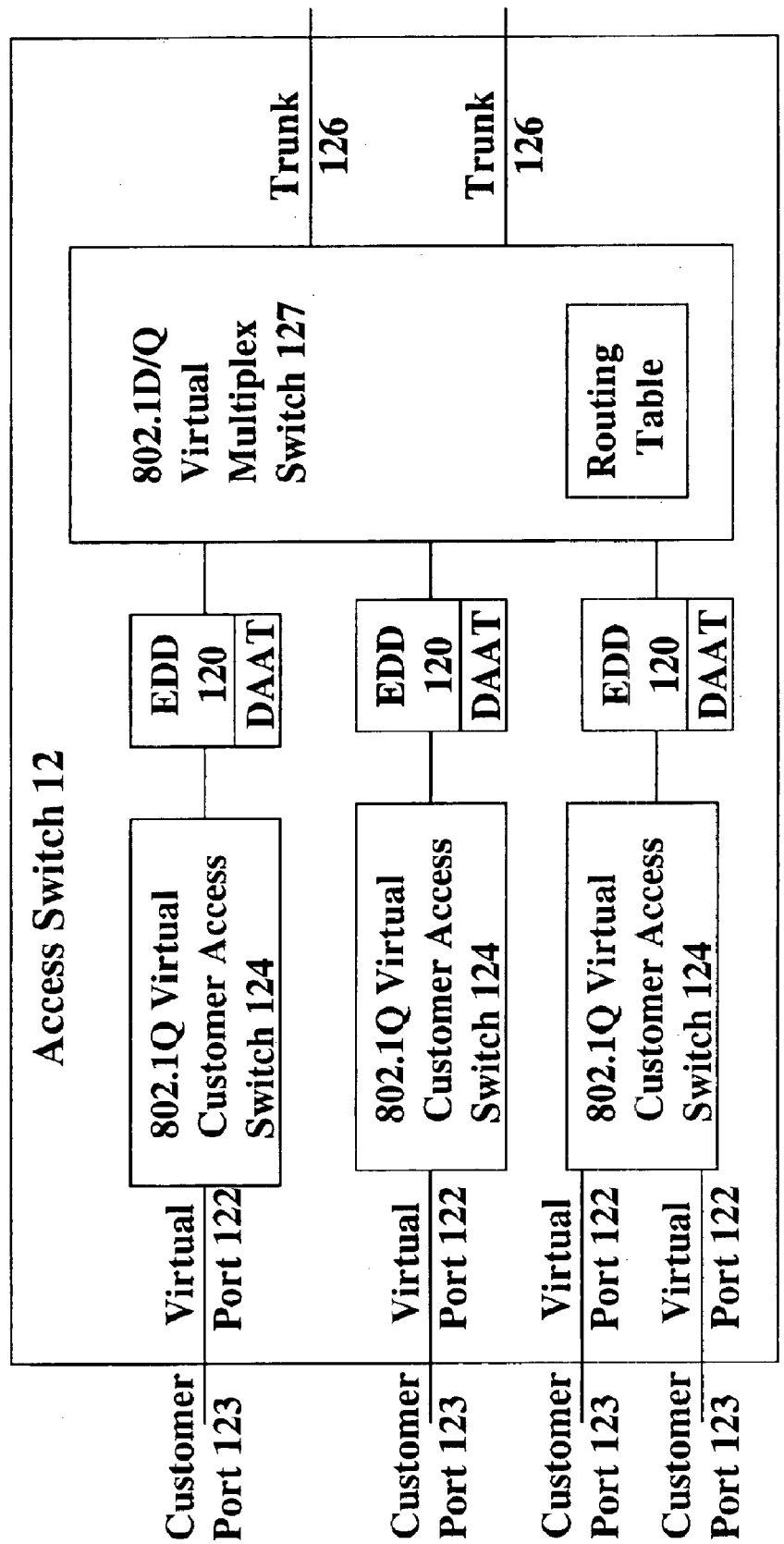
FIG. 2 is a block schematic diagram of an access switch of the network of FIG. 1.

FIG. 2 is a block schematic diagram of an access switch 12 of the network of FIG. 1 according to a first embodiment of the invention. The access switch 12 comprises a plurality of address assigners in the form of Encapsulation/Decapsulation Devices (EDDs) 120, each of which is connected to one or more customer ports 123 of the access switch 12 via a respective virtual customer access switch 124. All customer ports 123 associated with a particular EDD 120 and its customer access switch 124 are connected to the same customer LAN 20 via one or more access links 22—i.e. no customer access switch 124 or EDD 120 has customer ports 123 connected to the customer LANs 20 of more than one customer. The physical customer ports 123 map one-to-one onto respective virtual ports 122. Each customer access switch 124 uses IEEE 802.1 protocols to communicate with the customer LAN 20 to which it is connected via the customer port(s) 123.

The EDDs 120 are also connected to trunks 126 of the access switch 12 via a router in the form of a virtual multiplex switch 127 which operates according to IEEE 802.1D/Q protocols adapted to handle a longer than standard data frame as will be explained below.

Each EDD 120 maintains a respective Destinations Address Association Table (DAAT) which maps Medium Access Control (MAC) addresses of elements of the customer LANs 20 in Destination Address (DA) fields onto corresponding customer port addresses in Decapsulation Egress Address (DEA) fields. Each DA is mapped onto a single DEA, but each DEA may be mapped onto a plurality of DAs. Each customer has a unique set of DEAs corresponding to the virtual ports 122 and the associated customer ports 123 connected to that customer's private networks. If distinct customers use the same DA, that DA will be mapped onto a different DEA in the distinct DAATs used for these customers.

A typical customer will have customer LANs 20 using IEEE 802.1 protocols at more than one site and will want to exchange data packets in the form of IEEE 802.3 data frames between elements of the LANs 20 at different sites. As will be explained below, such customers may subscribe to a Carrier Virtual LAN (CVLAN) service provided by the NSP using the NSP network 10. The CVLAN service provides transparent LAN connectivity between customer LANs at different sites with full isolation between the virtual private LANs (or CVLANs) of many distinct customers.

An IEEE 802.3 data frame has a header comprising a Destination Address (DA) identifying a LAN element for which the data frame is intended and a Source Address (SA) identifying the LAN element from which the data frame is sent. When an IEEE 802.3 data frame addressed to a DA ion a customer's LAN 20 at a one site is sent on that customer's LAN 20 at another site, the customer's LAN 20 at the other site will route the frame to an access switch 12 connected to the customer's LAN 20 at the other site.

The access switch 12 receives the frame via a customer port 123 connected to the customer LAN 20 at the other site and routes the frame via the associated virtual port 122 and the customer access switch 124 to the EDD for that customer at that access switch 12.

Figure 3:
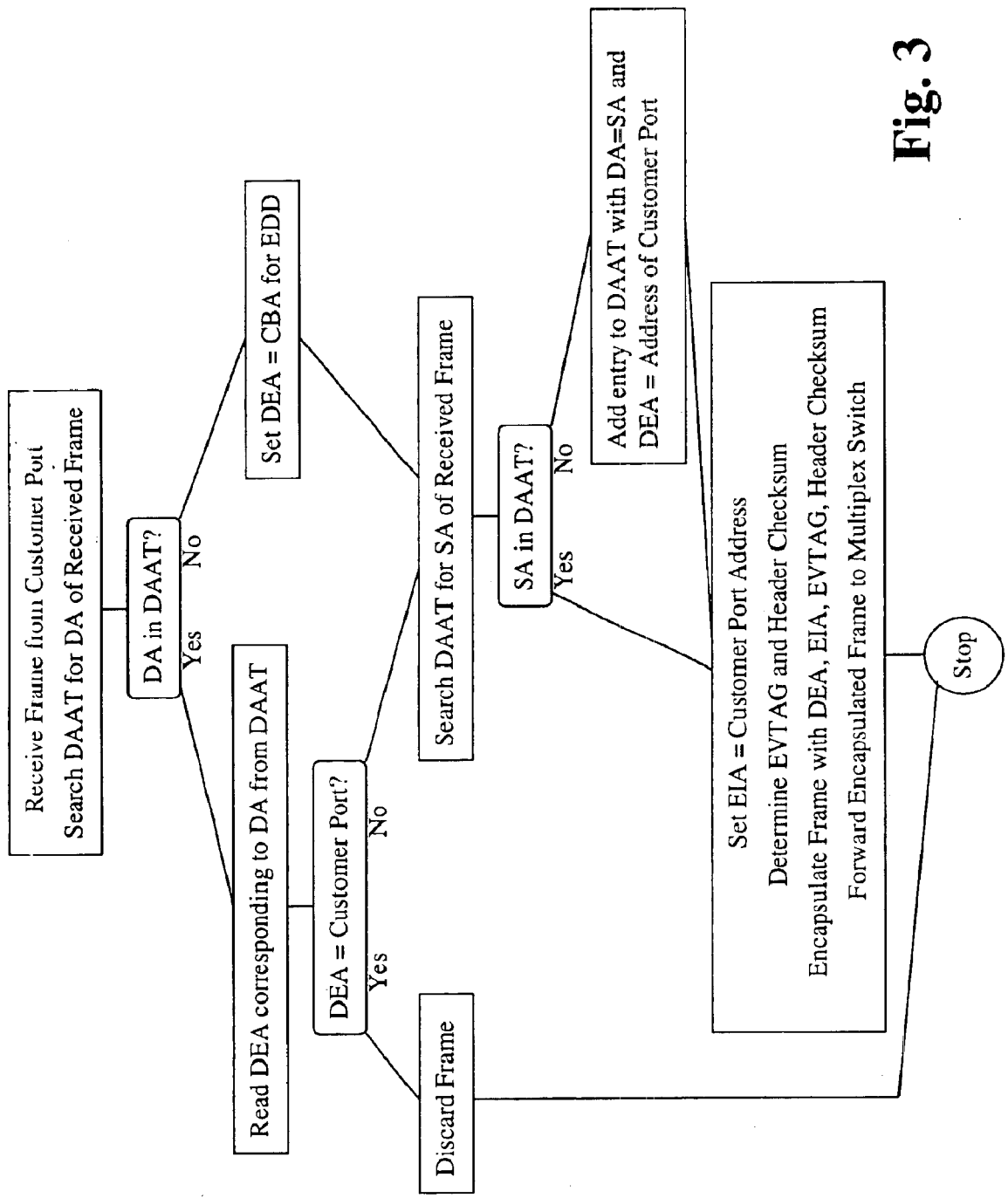
FIG. 3 is flow chart illustrating operation of an encapsulation/decapsulation device of the access switch of FIG. 1 on receipt of a data frame at a customer port of the access switch.

FIG. 3 is flow chart illustrating operation of the EDD 120 on receipt of the data frame via the customer port 122. The EDD 120 searches its DAAT for the DA of the received frame. If the DA is in the DAAT, the EDD 120 reads the DEA corresponding to the DA from the DAAT 129. If the DEA corresponds to the customer port 123 on which the frame was received, the frame is intended for an element of the customer's LAN 20 on which the frame was sent. In this case, the EDD 120 discards the frame since no transmission of the frame across the NSP network 10 is required.

However, if the DEA is not equal to the address of the customer port 123 on which the frame was received, the frame is intended for the customer's LAN 20 at another site. In this case, the frame is encapsulated by adding an additional header that includes the DEA and an Encapsulation Ingress Address (EIA) set equal to the address of the customer port 123 on which the frame was received. As will be explained below, the DEA is used to route the encapsulated frame through the NSP network 10 to a virtual port 122 and its associated customer port 123. The customer port 123 has an address corresponding to the DEA, and is connected to the customer LAN 20 on which the DA will be found.

If the DA is not found in the DAAT, the EDD 120 is unable to map the DA onto a corresponding DEA to rotate the frame across the NSP network 10. In this case, the EDD 120 encapsulates the frame with the DEA set to a CVLAN Broadcast Address (CBA) which enables the frame to be routed to all access switches 12 serving the CVLAN. Because the EDD serves only a single customer, the CBA can be made specific to that customer so that the frame is routed only to virtual ports 122 and associated customer ports 123 connected to sites of that customer.

If the DA of the received frame is a multicast address, the EDD 120 sets the DEA equal to a multicast egress address. This multicast egress address may correspond to the CBA of the CVLAN if multiple multicast groups within the CVLAN are not supported, or may correspond to a multicast address that is particular to the multicast group within the CVLAN if multiple multicast groups with the CVLAN are supported. Such egress address assignments may be arranged through suitable entries in the DAAT or by other means.

Unnecessary broadcasting of frames in the NSP network 10 wastes network resources. Consequently, the EDD 120 assesses whether the received frame contains information that can be used to augment the DAAT 129. In particular, when a frame having a particular network address in the SA field is received on a particular customer port 122, it can be inferred that this particular network address can be accessed via this particular customer port 122. Consequently, there should be an entry in the DAAT mapping the network address in the SA field onto the network address of the customer port 122.

The EDD determines whether that entry is missing from the DAAT by searching for the SA of the received frame in the DA fields of the DAAT. If the SA is found, the entry already exists. However, if the SA is not found, the EDD adds an entry to the DAAT, the entry having the SA of the received frame in the DA field and the address of the customer port 122 in the DEA field.

In addition to encapsulating the frame with the EIA and the DEA, the EDD 120 may encapsulate the frame with an Encapsulating VLAN tag (EVTAG) field similar to the VLAN tag of a standard IEEE 802.3 frame. The EVTAG field may contain a 12 bit VLAN identifier and a 3 bit Quality of Service (QoS) indicator.

The frame may also be encapsulated with a Header Checksum, a 32 bit value that will produce an all 1's value in a Cyclic Redundancy Check (CRC) register when a standard IEEE 802.3 checksum CRC procedure is applied to the encapsulation header including the Header Checksum. The all 1's value is the normal starting value for the CRC register in the IEEE 802.3 checksum procedure. The presence of this value in the CRC register at the end of the Header Checksum means that the IEEE 802.3 Checksum field, that was calculated and appended to the unencapsulated frame when the unencapsulated frame was created, can be used unchanged to protect the whole encapsulated frame during transmission through the NSP network 10. Consequently, IEEE 802.1D bridging can be used to forward encapsulated frames, provided only that the multiplex switches 127 are adapted to handle frames longer than standard IEEE 802.3 frames while preserving and using the Checksum values calculated at creation of the unencapsulated frames.

Figure 4:
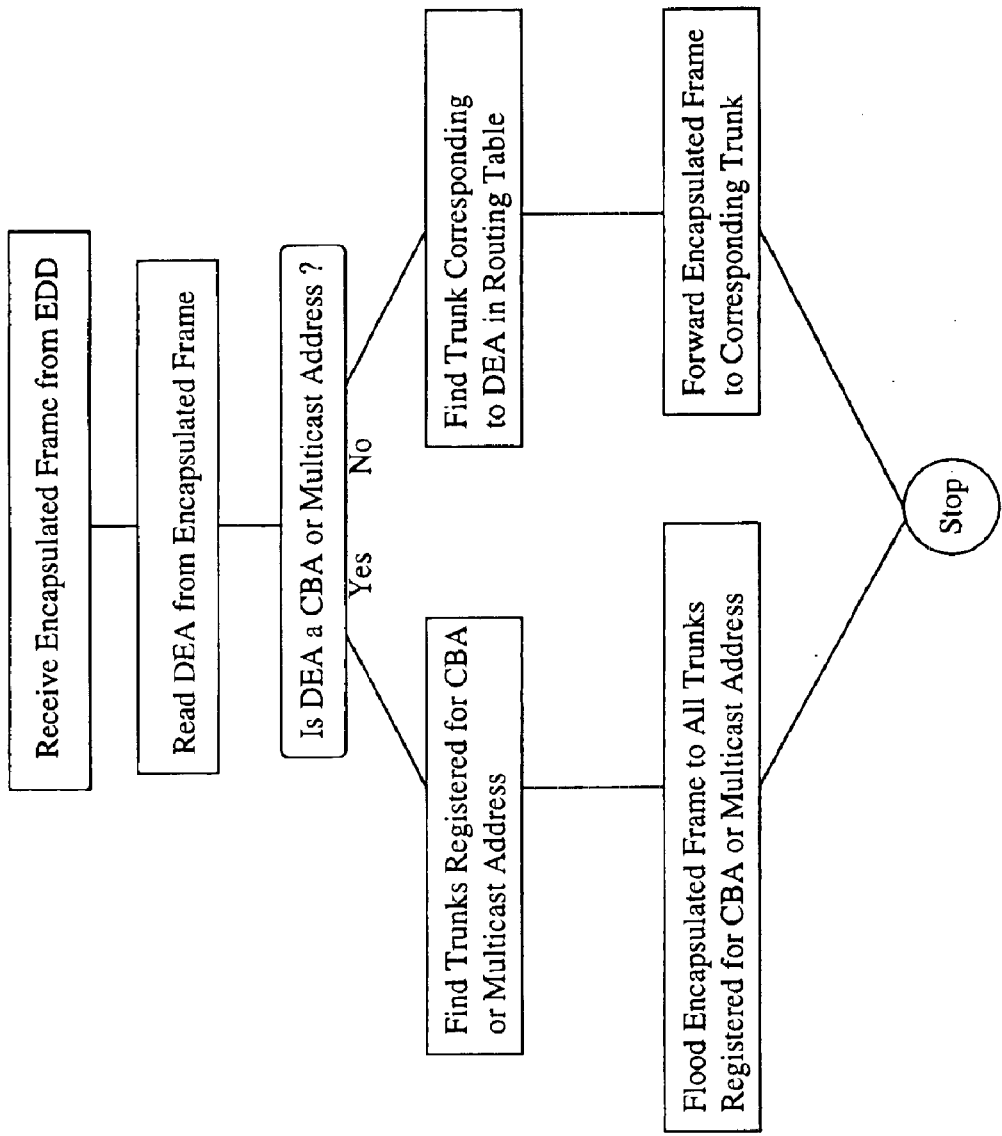
FIG. 4 is a flow chart illustrating operation of a multiplex switch of the access switch of FIG. 2 on receipt of an encapsulated data frame from the encapsulation/decapsulation device.

FIG. 4 is a flow chart illustrating operation of the multiplex switch 127 on receipt of an encapsulated frame from the EDD 120. The multiplex switch 127 is similar to a IEEE 802.1D/Q switch adapted to handle the increased length of the encapsulated frame and to operate on the added header.

On receipt of an encapsulated frame, the multiplex switch 127 reads the DEA from the header of the encapsulated frame and determines whether the DEA is a CBA. If the DEA is not a CBA, the multiplex switch 127 finds trunk 126 corresponding to the DEA in a routing table and forwards the encapsulated frame to that trunk 126. If the DEA is a CBA or a multicast egress address, the multiplex switch determines which trunks are registered for that CBA and forwards the encapsulated frame to all trunks 126 registered for that CBA. (The process of trunk registration is described in greater detail below.)

Any core switches 16 in the NSP network 10 operate essentially as described above for the multiplex switch 127 on receipt of an encapsulated frame at a trunk of the core switch 16.

Figure 5:
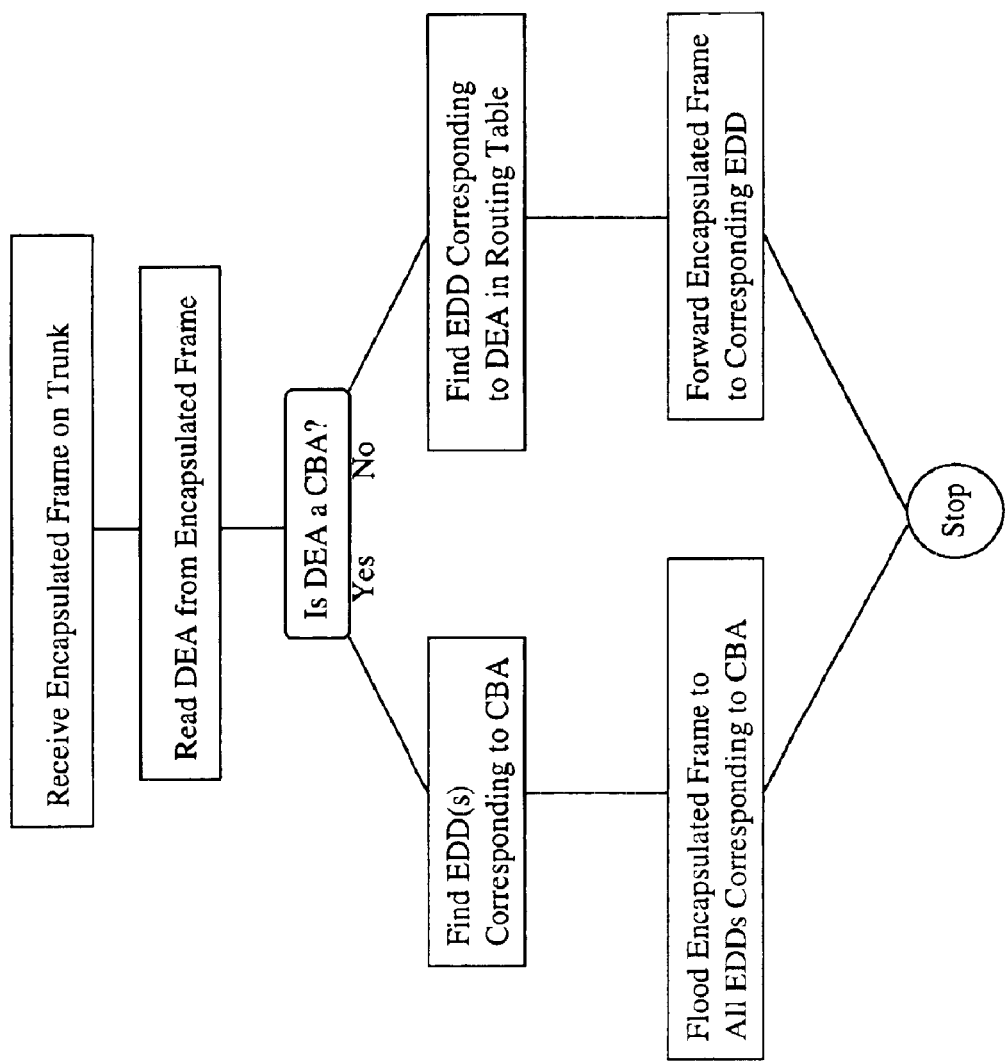
FIG. 5 is a flow chart illustrating operation of the multiplex switch of the access switch of FIG. 2 on receipt of an encapsulated data frame from another switch on a trunk.

FIG. 5 is a flow chart illustrating operation of the multiplex switch 127 on receipt of an encapsulated data frame from another switch of the NSP network 10 on a trunk 126 of the multiplex switch 127. The multiplex switch 127 reads the DEA from the header of the encapsulated frame. If the DEA is not a CBA, the multiplex switch 127 finds the EDD 120 corresponding to the DEA in a routing table and forwards the encapsulated frame to that EDD 120. If the DEA is a CBA, the multiplex switch 127 finds all EDDs 120 corresponding to the CBA and floods the encapsulated frame to all EDDs 120 corresponding to the CBA.

Figure 6:
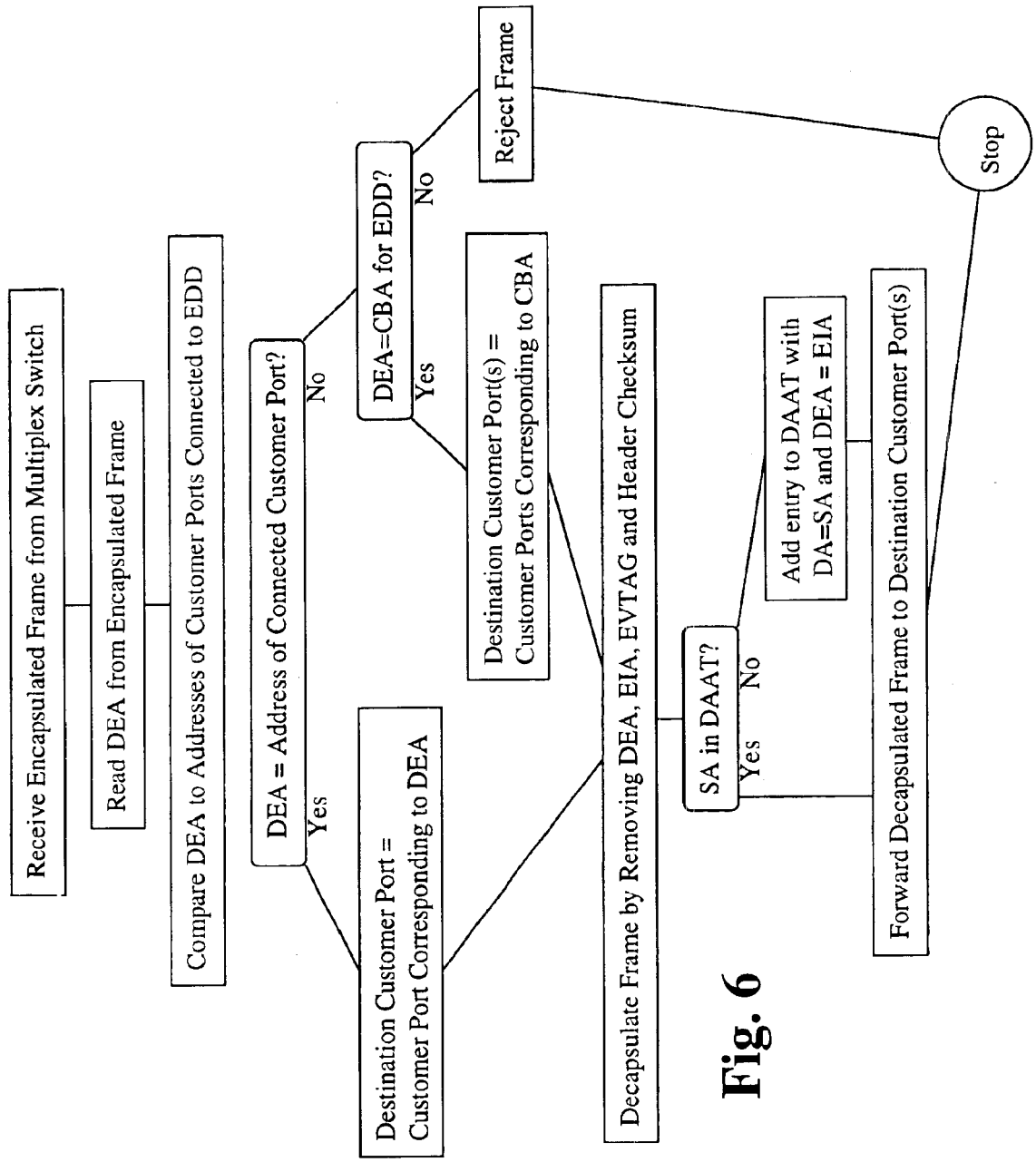
FIG. 6 is a flow chart illustrating operation of the encapsulation/decapsulation device on receipt of an encapsulated data frame from the multiplex switch.

FIG. 6 is a flow chart illustrating operation of the EDD 120 on receipt of an encapsulated data frame from the multiplex switch 127. The EDD 120 reads the DEA from the encapsulated frame and compares the DEA to the addresses of the customer ports 122 connected to the EDD 120 via the customer access switch 124. If the DEA matches the address of a customer port 123 connected to the EDD 120, the EDD 120 decapsulates the frame by removing the header containing the DEA and the EIA, and routes the decapsulated frame to the customer port 123 via the customer access switch 124 and the virtual port 122.

If the DEA does not match the address of any customer port 123 connected to the EDD 120, the EDD 120 determines whether the DEA is a CBA for the EDD 120. If the DEA is a CBA for the EDD 120, the EDD 120 decapsulates the frame by removing the header containing the DEA and the EIA, and routes the decapsulated frame to all customer ports 123 corresponding to the CBA.

If the DEA does not match the address of any customer port 123 connected to the EDD 120 and is not a CBA for the EDD 120, the frame is not forwarded to any customer port 123.

The EDD 120 also assesses whether the received encapsulated frame contains information that can be used to augment the DAAT. In particular, the EDD 120 searches for the SA of the received encapsulated frame in the DA fields of the DAAT. If the SA is found, the entry already exists. However, if the SA is not found, the EDD adds an entry to the DAAT, the entry having the SA of the received frame in the DA field and the EIA of the encapsulated frame in the DEA field.

It follows from the operations of the elements of the NSP network 10 as described above, that a typical IEEE 802.3 frame is routed across the NSP network 10 from a first site of a customer LAN 20 to a second site of the customer LAN 20 as follows:

1. The IEEE 802.1 frame is routed by the customer LAN 20 at the first site to a first access switch 12 serving the first site based on the DA of the frame.
2. The IEEE 802.3 frame is encapsulated at the first access switch 12 by adding a header comprising a DEA specifying a port on a second access switch 12 serving the second site of the customer LAN 20.
3. The encapsulated frame is routed across the NSP network 10 from the first access switch 12 to the second access switch 12 based on the DEA of the encapsulated frame. 4. The encapsulated frame is decapsulated by the second access switch 32 and forwarded to the second site of the customer LAN where it is routed based on the DA of the decapsulated frame.

When the access switch 12 receiving the frame from the first site of the customer LAN 20 is unable to determine the DEA from the DA of the received frame, the frame is flooded across the network to all sites of the customer LAN 20 as follows:

1. The IEEE 802.3 frame is routed by the customer LAN 20 at the first site to a first access switch 12 serving the first site based on the DA of the frame.
2. The IEEE 802.3 frame is encapsulated at the first access switch 12 by adding a header comprising a CBA in the DEA field.
3. The encapsulated frame is flooded across the NSP network 10 from the first access switch 12 to all access switches 12 serving sites of the customer LAN 20 based on the CBA of the encapsulated frame.
4. The encapsulated frame is decapsulated by the destination access switches 12 and forwarded to the other sites of the customer LAN where it is routed based on the DA of the decapsulated frame.

Similarly, IEEE 802.3 frames having a multicast address in the DA field are encapsulated with the CBA in the DEA field and are flooded across the NSP network 10 from the first access switch to all access switches 12 serving sites of the customer LAN 20.

The DEAs used for a particular customer are unique to that customer because of the technique used to fill the DAAT at each EDD 120. Each EDD 120 is assigned to a single customer and serves only virtual ports 122 and associated customer ports 123 which are assigned that customer. When an EDD 120 adds an entry to its DAAT based on receipt of an unencapsulated frame from a connected customer port 122, the DEA of that entry must be the DEA of the customer port 122 which is uniquely assigned to that customer. When an EDD 120 receives an encapsulated frame from the multiplex switch 127, it verifies that the frame has a DEA corresponding to a connected customer port 123 or a CBA corresponding to its assigned customer to ensure that the frame comes from within the CVLAN of its customer before adding any entry to its DAAT. Such an entry must include the EIA of the frame in the DEA field, and that EIA corresponds to a customer port 122 that is assigned to the same customer—otherwise the received frame would not have a DEA or CBA corresponding to that customer.

Because the virtual ports 122 and associated physical customer ports 123 connected to each customer LAN 20 and the corresponding EDDs 120, DAATs, DEAs and CBAs are unique to that particular customer, frames cannot be transmitted from one customer to any other customer even though the frames are transmitted over a shared NSP network 10. Consequently, each customer has a CVLAN that is isolated from the CVLANs of other customers. The NSP network 10 can provide a very large number of isolated CVLANs to serve a very large number of customers because the isolation between CVLANs is determined by unique sets of virtual ports and associated broadcast addresses rather than by a more limited number of CVLAN identifiers.

However, only the virtual ports 122 and associated customer ports 123, the customer access switches 124, the EDDs 120 and the DAATs are dedicated to specific customers. The multiplex switches 127, core switches 16 and transmission facilities 14 are shared among many customers for economies of scale. Moreover, key elements of the customer access switches 124, multiplex switches 127 and core switches 16 can be provided using proven IEEE 802.1D/Q hardware and software with relatively minor modifications for further cost advantages. The extensive use of modified IEEE 802.1D/Q techniques in this embodiment of the NSP network 10, also ensures that extensive industry experience in operating IEEE 802.1 networks can be applied readily to the operation of this network.

The above description refers to registration of CBAs at trunks 126 of the access switches 12. IEEE 802.1D defines procedures for registering multicast groups at trunks such that frames carrying a particular multicast address in the DA field are forwarded only by trunks which have that multicast address registered for that trunk. The multicast group registrations are propagated by the IEEE 802.1D GARP Multicast Registration Protocol (GMRP) to all trunks in the network needed to create a minimal subset of interconnections that interconnects all registrants to the group.

These multicast group registration techniques can be adapted to the registration of trunks for CBAs in the NSP network 10. Each EDD 120 registers a corresponding CBA at its multiplex switch port so that encapsulated frames having a particular CBA in the DEA field will be transmitted over only those trunks needed to transmit the frame to the other EDDs 120 of the particular CVLAN corresponding to the CBA. This avoids wasteful transmission of frames to EDDs 120 that are not participating in the CVLAN.

According to the description given above, all frames having a multicast DA may be assigned a selected CBA for a DEA, the CBA being selected according to the ingress port at which the frame was received. While this procedure restricts frames to the CVLANs for which they are intended, it does not enable customers to restrict multicast frames to distinct multicast groups within their CVLANs.

Distinct multicast groups within CVLANs can be supported by defining a distinct multicast DEA for each such multicast group. The multicast DEAs must be unique to the CVLAN to which the multicast group belongs, and the EDDs 120 must translate multicast DAs of unencapsulated frames entering the NSP network 10 into the appropriate multicast DEAs using the DAATs or some other means. The multicast DEAs should be locally administered by the NSP.

The NSP can ensure that each multicast DEA is unique to a particular CVLAN within the NSP network 10 is by requiring a multicast DEA format that combines a CVLAN identifier with a multicast group identifier. For example, each multicast DEA could comprise:
1. a multicast bit (indicating whether the address is a unicast address or a multicast address),
2. a local administration bit (indicating whether the address is locally administered),
3. a CVLAN identifier (identifying the CVLAN to which the packet is to be restricted),
4. an IP multicast bit (indicating whether the multicast is an IP multicast), and
5. a multicast group identifier (identifying the multicast group within the CVLAN to which the packet is to be restricted).

The local administration bit can be used to detect frames bearing multicast addresses that are not locally administered so that such frames can be discarded to ensure that isolation between distinct CVLANs is preserved.

The multicast group identifier can be the multicast DA or an identifier derived from the multicast DA. Because the multicast DEAs include a CVLAN identifier, the same multicast DAs can be used in distinct CVLANs without loss of isolation between distinct CVLANs.

According to this addressing scheme, the CBA for a particular CVLAN could comprise:
1. a 1 for the multicast bit,
2. a 1 for the local administration bit,
3. the CVLAN identifier for the particular CVLAN'
4. a 0 for the IP multicast bit, and
5. a field of O's for the multicast group identifier.

The IEEE 802.1D CARP Multicast Registration. Protocol (GMRP) referenced above can be modified for NSP networks 10 supporting multicast groups within CVLANs to create a minimal subset of interconnections that interconnects all registrants to the multicast group. In particular, the GMRP is modified to ensure that GMRP messages related to multicast DEAs other than CBAs are transmitted and create trunk registrations only on trunks registered for the CBA of the CVLAN to which the multicast DEA belongs. Consequently, GMRP message activity for multicast DEAs other than CBAs are confined to the physical topology in which messages addressed by the CBA can propagate. GMRP messages required for the registration of CBAs are not so confined, but such messages are infrequent because new registrations for CBAS occur only when a new customer site is configured.

A frame bearing a multicast DEA other than a CBA may be transmitted on a trunk only if the trunk has received a GMRP group registration generated by a GMRP application from another switch. This is the fundamental multicast tree pruning rule of IEEE 802.1D "extended filtering This technique achieves bandwidth savings by ensuring that multicast frames are transmitted on trunks only if a station that can be reached on that trunk has indicated an interest in receiving multicasts from that multicast group.

EDDs 120 of the NSP network 10, must translate IGMP join requests entering the NSP network 10 into GMRP join requests for forwarding into the NSP network 10 according to the modified GMRP procedures described above.

In the NSP network 10 described above, each CVLAN is defined by a distinct set of virtual ports 122 have a one-to-one mapping to a respective distinct set of customer ports 123 having physical addresses defining a distinct set of respective egress addresses. According to this scheme for isolating distinct CVLANs in the NSF network 10, each CVLAN would require a separate physical port and transmission link for connection to each ISP router to which connection of the CVLAN is required. However, it is not economically feasible to provide a separate dedicated link for connection of each CVLAN to each ISP router. Consequently, alternative arrangements are required for connection of the NSP network 10 to ISP routers over transmission links shared among CVLANs. The alternative arrangements must preserve the isolation between the CVLANs.

Figure 7:
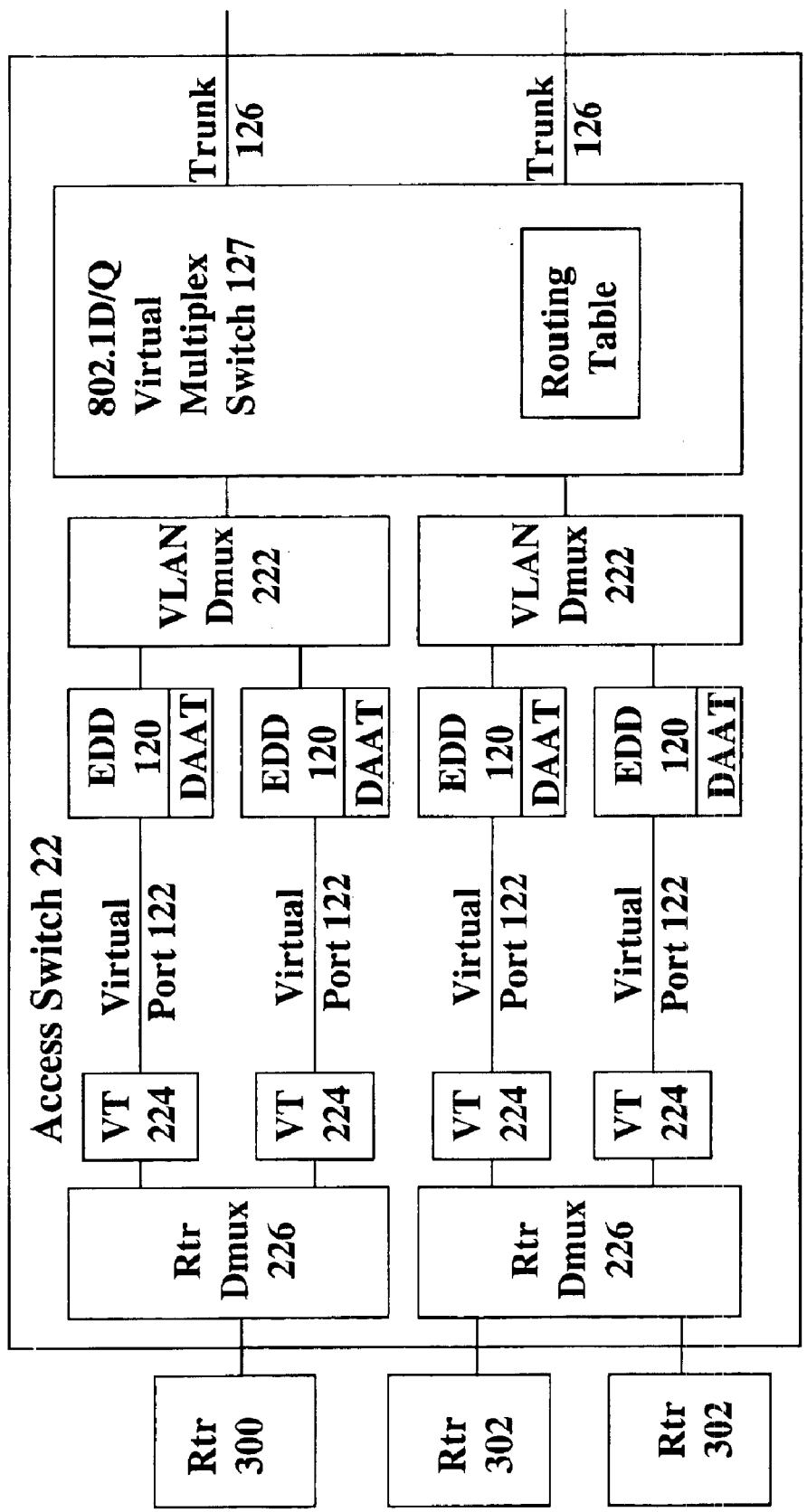
FIG. 7 is a block schematic diagram showing a first embodiment 42 of an access switch adapted to support connection of the NSP network to ISP routers.

FIG. 7 is a block schematic diagram showing a first embodiment 22 of an access switch adapted to support connection of the NSP network 10 to ISP routers 300, 302. The ISP routers 300, 302 are IEEE 802.1 routers that use VLAN tags to separate CVLANs.

The access switch 22 comprises a plurality of address assigners in the form of EDDs 120 and a router in the form of a virtual multiplex switch 127 as did the access switch 12. The access switch 22 further comprises a plurality of VLAN demultiplexers 222 connected between the multiplex switch 127 and groups of the EDDs 120, each VLAN demultiplexer 222 being associated with a respective egress address or a respective distinct set of egress addresses. Each EDD 120 is connected to a respective virtual port 122. A respective VLAN translator 224 is connected to each virtual port 122, and each group of VLAN translators 224 is connected to a respective router demultiplexer 226. The router demultiplexers 226 are connected to external ISP routers 300, 302.

On receipt of an encapsulated packet having an egress address corresponding to one of the external routers 300, 302 via a trunk 126, the virtual multiplex switch 127 routes the encapsulated packet to a VLAN demultiplexer 222 selected according to the egress address. The selected VLAN demultiplexer 222 routes the encapsulated packet to an EDD 120 selected according to the ingress address of the encapsulated packet. This selection scheme ensures that all encapsulated packets having a common egress address and an ingress address corresponding to a virtual port 122 in a particular set of the distinct sets of virtual ports 122 are routed to an EDD 120 associated with that egress address and that particular distinct set of virtual ports 122.

Because the egress address of a packet directed to an ISP router 300, 302 identifies the ISP router 300, 302, it does not uniquely identify the CVLAN to which the packet is to be restricted. Consequently, the VLAN demultiplexer 222, uses the ingress address of the packet to determine which EDD 120 should process the packet since the ingress address does uniquely identify the CVLAN to which the packet is restricted. However, when the egress address is a broadcast or multicast egress address employing the format described above for broadcast and multicast egress addresses, the VLAN demultiplexer 222 may determine which EDD 120 to route the packet to, either from the egress address or from the ingress address.

Each VLAN demultiplexer 222 may maintain a table for associating ingress addresses with EDDs 120 and may employ that table to determine the routing of packets to EDDs 120. The VLAN demultiplexers 222 may use the ingress addresses and egress addresses of broadcast and multicast packets to populate the table. In particular, when a VLAN demultiplexer 222 receives a broadcast or multicast packet having an ingress address that does not appear in any ingress address field of the table, it may create a new entry having the ingress address in an ingress address field of the table and an EDD identifier determined from the broadcast or multicast egress address of the packet.

Figure 8:
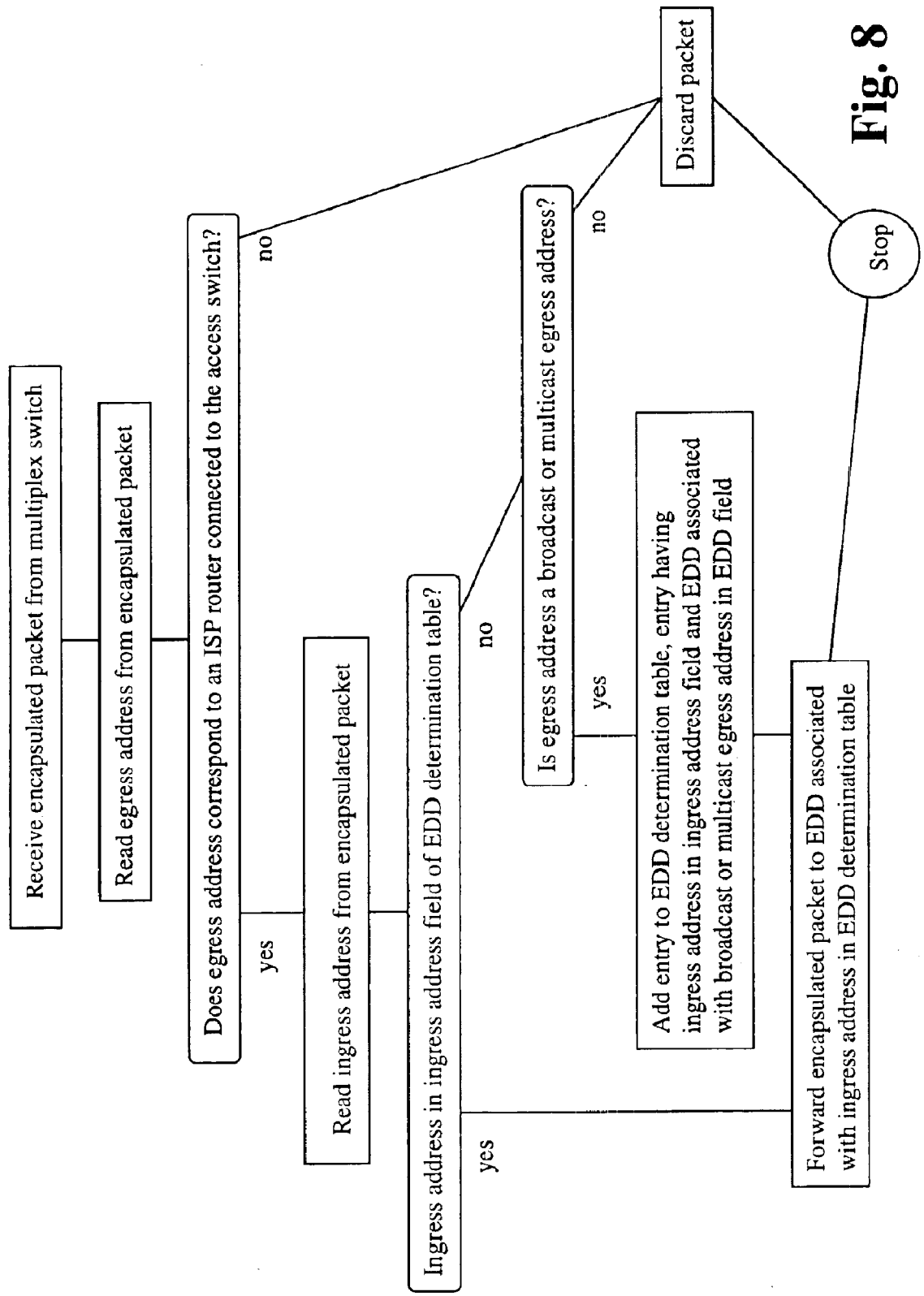
FIG. 8 is a flow chart illustrating aspects of the operation of a VLAN demultiplexer of the access switch of FIG. 7.

FIG. 8 is a flow chart illustrating operation of the VLAN demultiplexers 222 on receipt of a packet from the multiplex switch 127 in more detail.

The selected EDD 120 decapsulates the packet and forwards it via the respective virtual port 122 to the respective VLAN translator 224. The VLAN translator 224 applies a respective VLAN identifier to the packet. The VLAN identifier corresponds to the distinct set of ports containing the ingress port, i.e. it is particular to the CVLAN which corresponds to that distinct set of ports The VLAN translator 224 forwards the resulting packet to the router demultiplexer 226.

The VLAN translators 224 may receive broadcast packets for VLANs to which are not supported by the ISP routers 300, 302. The VLAN translators 224 discard such packets.

The router demultiplexer 226 routes the packet to an IEEE 802.1 external router 300. The external router 300 preserves isolation of CVLANs using VLAN identifiers according to the IEEE 802.1 standard.

On receipt of a packet from one of the external routers 300, the router demultiplexer 226 routes the packet to VLAN translator 224 selected according to a VLAN identifier of the received packet. The VLAN translator 224 forwards the packet to its respective EDD 120. The EDD 120 encapsulates the packet with an ingress address corresponding to its respective virtual port 122 and an egress address corresponding to its destination address, and forwards the encapsulated packet to the VLAN demultiplexer 222. The VLAN demultiplexer 222 forwards the encapsulated packet to the virtual multiplex switch 127 for routing according to the egress address.

Note that the arrangement described above enables a particular CVLAN within the network 10 to be mapped onto one VLAN identifier in a first IEEE 802.1 VLAN identifier space supported by a first external router 300 or plurality of routers 300. The same CVLAN within the network 10 may be mapped onto another VLAN identifier in a second IEEE 802.1 VLAN identifier space supported by a second external router 302 or plurality of routers 302, so assignment of VLAN identifiers in distinct external IEEE 802.1 VLAN networks need not be coordinated. Moreover, the arrangement described above enables the same VLAN identifier indifferent IEEE 802.1 VLAN identifier spaces to be mapped onto different CVLANs in the network 10. This is advantageous because, as noted above, each IEEE 802.1 VLAN identifier space is limited to 4095 distinct VLANS, whereas the network 10 can support many times that number of CVLANs.

In the embodiment of FIG. 7, the virtual ports 122 have the same properties as the virtual ports 122 of the embodiment of FIG. 2. In particular, each CVLAN has a distinct set of virtual ports 122, no virtual port 122 belonging to more that one of the distinct sets.

In the arrangement of FIG. 7, each customer can choose his router-access VLAN identifiers arbitrarily. There is no requirement that VLAN identifier choice be coordinated between multiple customers. Each ISP router 300, 302 participates in only one VLAN identifier space. The access switch 22 translates VLAN identifiers between this one VLAN identifier space and the many VLAN identifier spaces of the NSF network 10. The NSP network 10 has one VLAN identifier space for each distinct CVLAN. Each ISP router 300, 302 may either share a VLAN identifier space with one or more other routers belonging to the same ISP or have its own dedicated VLAN identifier space.

The NSP must establish an association between each customer VLAN requiring ISP router access and a unique VLAN in each ISP router VLAN identifier space This association requires a three-way agreement between the customer, the NSP and the ISP, as follows:

1. The ISP needs to know, for each customer, which subnets are to be supported. The NSP decides which of his VLAN identifiers he will assign to each subnet.
2. Each customer needs to know the subnet mask and router IP address for each subnet and which of his VLAN identifiers he will assign to each subnet.
3. The NSP needs to know the pairing of VLANs created by the decisions taken by the ISP and the customer to support the subnet. The VLAN pairing created for each subnet must be configured in the VLAN translating access switch 22 so that VLAN identifiers may be modified in packets passing between router access VLAN identifier spaces and customer VLAN identifier spaces.

Figure 9:
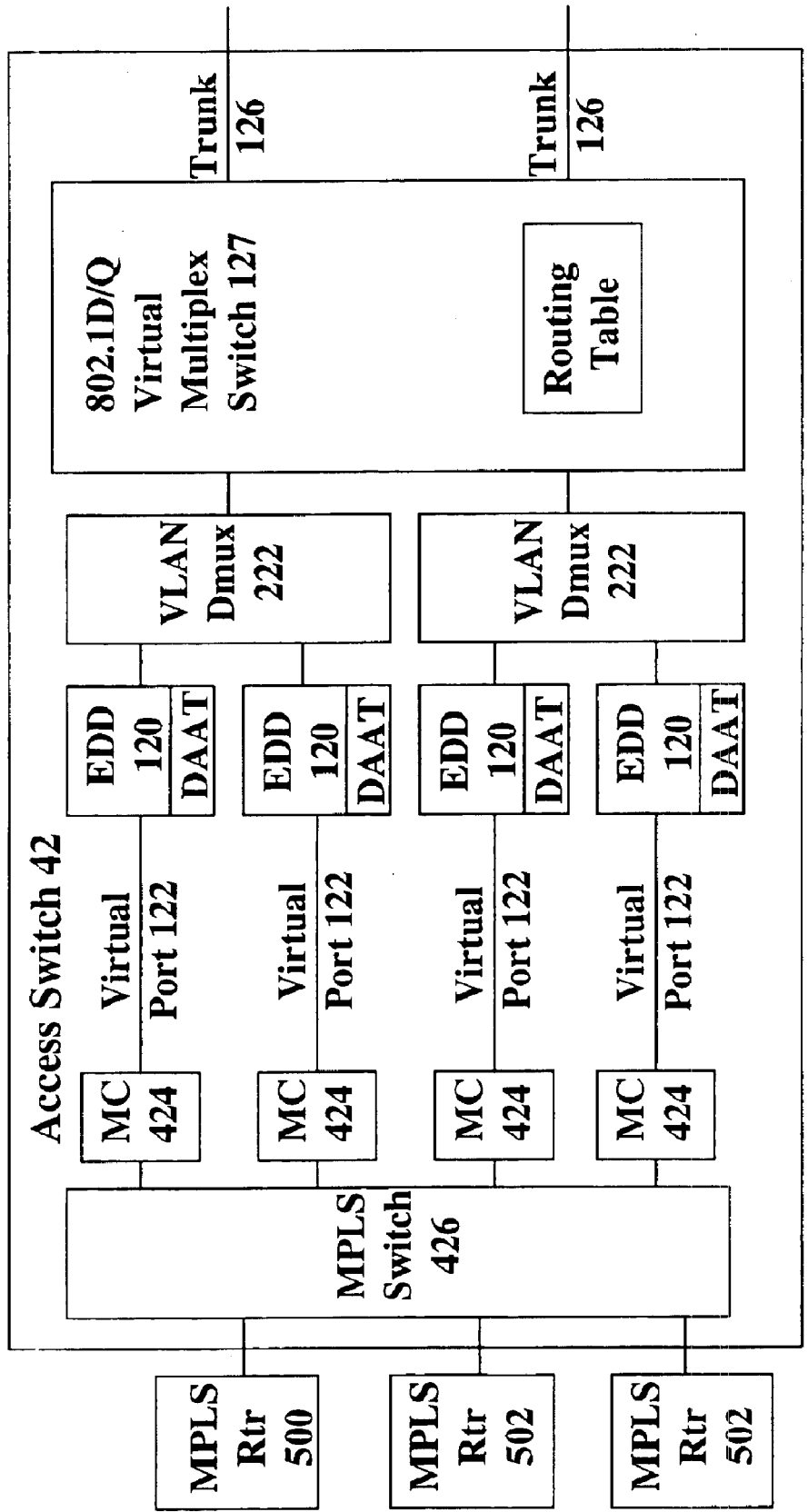
FIG. 9 is a block schematic diagram showing a second embodiment 42 of an access switch adapted to support connection of the NSP network to ISP routers.

FIG. 9 is a block schematic diagram showing a second embodiment 42 of an access switch adapted to support connection of the network 10 to ISP routers 500, 502. The ISP routers 500, 502 are MPLS routers providing multiple virtual router capability.

The access switch 42 comprises a plurality of address assigners in the form of EDDs 120 and a router in the form of a virtual multiplex switch 127 as did the access switches 12, 22. The access switch 42 further comprises a plurality of VLAN demultiplexers 222 connected between the multiplex switch 127 and groups of the EDDs 120, each VLAN demultiplexer 222 being associated with a respective egress address as in the access switch 22. Each EDD 120 is connected to a respective virtual port 122. A respective Multi-Protocol Label Switching (MPLS) converter 424 is connected to each virtual port 122, and the MPLS converters 424 are connected to a MPLS switch 426.

On receipt of an encapsulated packet on a trunk 126, the virtual multiplex switch 127 routes the encapsulated packet to a VLAN demultiplexer 222 selected according to the egress address. The selected VLAN demultiplexer 222 routes the encapsulated packet to an EDD 120 selected according to the ingress address of the encapsulated packet. This selection scheme ensures that all encapsulated packets having a common egress address and an ingress address corresponding to a virtual port 122 in a particular set of the distinct sets of virtual ports 122 are routed to an EDD 120 associated with that egress address and that particular distinct set of virtual ports 122.

The selected EDD 120 decapsulates the packet and forwards it via the respective virtual port 122 to the respective MPLS converter 424. The MPLS converter 424 applies a respective MPLS label to the packet. The MPLS label corresponds to the distinct set of virtual ports 122 containing the ingress virtual port 122, i.e. it is particular to the CVLAN which corresponds to that distinct set of virtual ports. The MPLS converter 424 forwards the resulting packet to the MPLS switch 426. The MPLS switch 426 routes the packet to an external router 500. The external router 500 preserves isolation of CVLANs using the MPLS labels that are unique to CVLAN.

On receipt of a packet from one of the external routers 500, the MPLS switch 426 routes the packet to a MPLS converter 424 selected according to a MPLS label of the received packet. The MPLS converter 424 forward the packet to its respective EDD 120 via its respective virtual port 122. The EDD 120 encapsulates the packet with an ingress address corresponding to its respective virtual port 122 and an egress address corresponding to its destination address, and forwards the encapsulated packet to the VLAN demultiplexer 222. The VLAN demultiplexer 222 forwards the encapsulated packet to the virtual multiplex switch 127 for routing according to the egress address.

Note that the arrangement described above enables a particular CVLAN within the network 10 to be mapped onto one MPLS label in a first MPLS label space supported by a first external router 500 or plurality of routers 500. The same CVLAN within the network 10 may be mapped onto another MPLS label in a second MPLS label space supported by a second external router 502 or plurality of routers 502.

Figure 10:
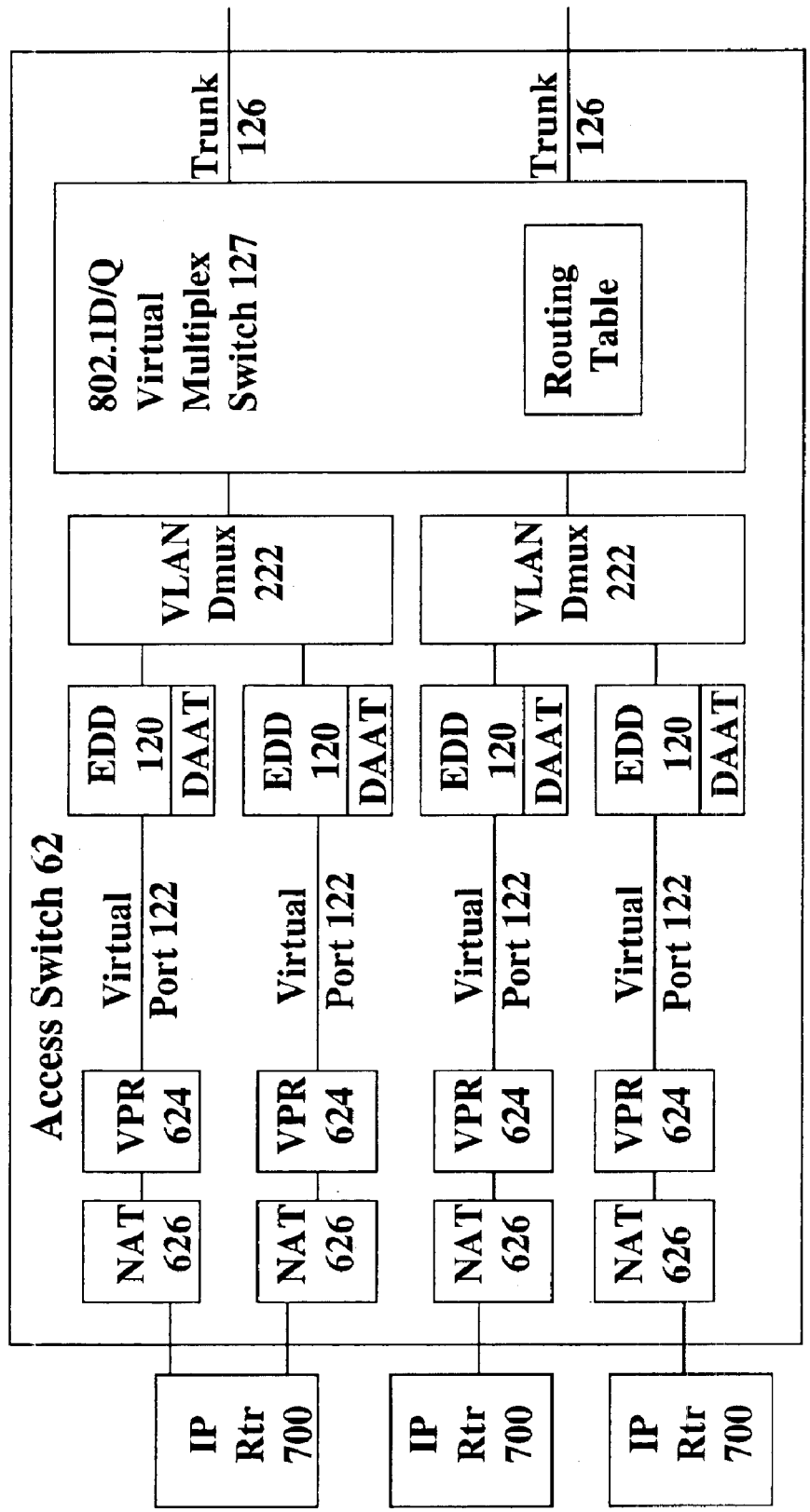
FIG. 10 is a block schematic diagram showing a third embodiment of an access switch 62 adapted to support connection of the NSP network to ISP routers.

FIG. 10 is a block schematic diagram showing a third embodiment of an access switch 62 adapted to support connection of the network 10 to ISP routers 700.

The access switch 62 comprises a plurality of address assigners in the form of EDDs 120 and a router in the form of a virtual multiplex switch 127 as did the access switches 12, 22, 42. The access switch 62 further comprises a plurality of VLAN demultiplexers 222 connected between the multiplex switch 127 and groups of the EDDs 120, each VLAN demultiplexer 222 being associated with a respective egress address as in the access switches 22, 42. Each EDD 120 is connected to a respective virtual port 122. A respective virtual private router 624 is connected to each virtual port 122, and each virtual private router 624 is connected to respective network address translator 626.

On receipt of an encapsulated packet on a trunk 126, the virtual multiplex switch 127 routes the encapsulated packet to a VLAN demultiplexer 222 selected according to the egress address. The selected VLAN demultiplexer 222 routes the encapsulated packet to an EDD 120 selected according to the ingress address of the encapsulated packet. This selection scheme ensures that all encapsulated packets having a common egress address and an ingress address corresponding to a virtual post 122 in a particular set of the distinct sets of virtual ports 122 are routed to an EDD 120 associated with that egress address and that particular distinct set of virtual ports 122.

The selected EDD 120 decapsulates the packet and forwards it via the respective virtual port 122 to the respective virtual private router 624. The virtual private router 624 discards any packets not having a destination IF address corresponding to the router 700 connected to the respective network address translator 626, and forwards any packets having a destination address corresponding to the router 700 to the respective network address translator 626. The network address translator 626 translates the destination address from a private IP address in the customer's private IP address space to a corresponding public IP address in the public IP address space. The network address translator 626 forwards the packet with the translated IP address to the router 700.

On receipt of a packet from one of the external routers 700, a network address translator 626 translates the destination address of the received packet from a public IP address to a corresponding private IP address in the private IP address space of the NSP network 10. The network address translator 626 forwards the packet with the translated IP address to its respective virtual private router 624. The virtual private router 624 applies a corresponding MAC destination address to the packet in the DA field and forwards the resulting packet to its respective EDD 120 via its respective virtual port 122. The EDD 120 encapsulates the packet with an ingress address corresponding to its respective virtual port 122 and an egress address corresponding to its destination address, and forwards the encapsulated packet to the VLAN demultiplexer 222. The VLAN demultiplexer 222 forwards the encapsulated packet to the virtual multiplex switch 127 for routing according to the egress address.

Note that the arrangement described above enables a particular CVLAN within the network 10 to be mapped onto a restricted set of IF addresses in the IP routers 700.

In the arrangement of FIG. 10, one or more of the IP routers could be integrated into the access switch 62 to provide an IP router appropriate for direct connection to the NSP network 10.

Some or all of the network address translators 626 of FIG. 10 could be eliminated if the IP addresses corresponding to one or more of the virtual private networks in the NSP network are registered as public IP addresses.

Moreover, the arrangements of two or more of FIGS. 2, 7, 9 and 10 could be integrated into a single access switch in which a virtual multiplex switch 127 is shared between the combined arrangements. In this case, and in networks that combine the functionality of one or more of FIGS. 7, 9 and 10 with the functionality of FIG. 2, each distinct set of virtual ports 122 defining a virtual private network may include some virtual ports 122 which map one-to-one onto corresponding physical ports, such as the customer ports 123 of the FIG. 2 embodiment. The physical ports are each associated with a unique respective physical address. Other groups of virtual ports 122 may be connected to a common physical port for each group. Each such virtual port 122 is associated with a unique combination of the physical address of the common physical port and some other identifier that identifies the virtual private network with which the virtual port 122 is associated. The other identifier may be one or more of an ingress address, a virtual private network identifier, a VLAN identifier, an MPLS label or any other identifier sufficient to unambiguously determine the virtual private network with which the virtual port 122 is associated.

While embodiments of the invention are described above in terms of standard IEEE 802.3 frames and IEEE 802.1 protocols, the invention could be practiced with other frame formats and protocols. While encapsulation with IEEE 802.1 addresses is described above, the frames could be encapsulated with other types of addresses, such as IP addresses, for example.

These and other variations do not depart from the principles of the invention as defined by the claims below.

We claim:

1. A method of routing packets through a connectionless communications network having a plurality of distinct sets of virtual ports, no virtual port belonging to more than one of the distinct sets, a respective distinct broadcast address being assigned to each distinct set of virtual ports, the method comprising:

assigning a respective egress address to each packet entering the network via an ingress virtual port, the respective egress address corresponding to a respective destination address of the entering packet when a correspondence between the destination address and an egress address is known, and the respective egress address being a broadcast egress address being selected based on the ingress virtual port to correspond to the set comprising the ingress virtual port when no correspondence between the destination address and an egress address is known;

adding to each packet entering the network via an ingress virtual port the respective egress address assigned to that packet to provide a corresponding modified packet;

without establishing a connection through the network for routing the packet, routing the modified packet across the network according to the respective added egress address from the ingress virtual port to at least one egress virtual port associated with the assigned egress address, said routing being restricted to virtual ports belonging to the distinct set of virtual ports which includes the ingress virtual port; and removing from each modified packet received at an egress virtual port of the network the egress address assigned to that packet to provide a restored packet.

2. A method as defined in claim 1, wherein, when the destination address of the packet is a unicast address and a correspondence between the destination address and a unicast egress address is known:

the step of assigning an egress address composes assigning the unicast egress address, said unicast egress address corresponding to an egress virtual port belonging to the distinct set of virtual ports which includes the ingress virtual port, the destination address being accessible from said egress virtual port; and the step of routing the packet comprises routing the packet to said egress virtual port.

3. A method as defined in claim 1, wherein, when the destination address of the packet is a unicast address and no correspondence between the destination address and an egress address is known:

the step of assigning an egress address comprises assigning a broadcast egress address corresponding to the distinct set of virtual ports which includes the ingress virtual port; and the step of routing the packet comprises routing the packet to each virtual port, other than the ingress virtual port, of the distinct set of virtual ports which includes the ingress virtual port.

4. A method as defined in claim 1, wherein, when the destination address of the packet is a multicast address:

the step of assigning an egress address comprises assigning a broadcast egress address corresponding to the distinct set of virtual ports which includes the ingress virtual port; and the step of routing the packet comprises routing the packet to each virtual port of the distinct set of virtual ports which includes the ingress virtual port other than the ingress virtual port.

5. A method as defined in claim 1, wherein, when the destination address of the packet is a multicast address and a correspondence between the destination address and a multicast egress address is known:

the step of assigning an egress address comprises assigning the multicast egress address, said multicast egress address corresponding to a plurality of virtual ports belonging to the distinct set of virtual ports which includes the ingress virtual port; and the step of routing the packet comprises routing the packet to each virtual port of said plurality of virtual ports belonging to the distinct set of virtual ports which includes the ingress virtual port.

6. A method as defined in claim 5, wherein:

the step of routing the packet according to the respective egress address comprises routing the packet via trunks of the network; and when the packet is assigned a multicast egress address corresponding to a plurality of virtual ports in a distinct set of virtual ports, the step of routing the packet comprises routing the packet via a restricted set of trunks containing only those trunks required to reach virtual ports in the plurality of virtual ports corresponding to said multicast egress address.

7. A method as defined in calm 1, further comprising:

assigning a respective ingress address to each packet entering the network, the respective ingress address corresponding to a virtual port via which the packet enters the network;

using the assigned ingress addresses to populate address association tables; and using the address association tables to determine correspondences between destination addresses and egress addresses.

8. A method as defined in claim 1, wherein:

the step of routing the packet according to the respective egress address comprises routing the packet via trunks of the network; and when the packet is assigned a broadcast egress address corresponding to a distinct set of virtual ports, the step of routing the packet comprises routing the packet via a restricted set of trunks containing only those trunks required to reach virtual ports in the distinct set of virtual ports corresponding to said broadcast egress address.

9. A method as defined in claim 1, wherein at least one physical port of the network maps one-to-one onto a corresponding virtual port of network, said physical port and said corresponding virtual port being associated with a respective distinct physical address.

10. A method as defined in claim 1, wherein at least one physical port of the network maps onto a corresponding plurality of virtual ports of the network, said physical port being associated with a respective distinct physical address, and each virtual port of said corresponding plurality of virtual ports being associated with a respective distinct combination of said physical address and a respective virtual network identifier.

11. A method of routing packets through a connectionless communications network having a plurality of distinct sets of virtual ports, no virtual port belonging to more than one of the distinct sets, a respective distinct broadcast address being assigned to each distinct set of virtual ports, the method comprising:

assigning a respective egress address to each packet entering the network via an ingress virtual port, the respective egress address corresponding to a respective destination address of the entering packet when a correspondence between the destination address and an egress address is known, and the respective egress address being a broadcast egress address selected based on the ingress virtual port to correspond to the set comprising the ingress virtual port when no correspondence between the destination address and an egress address is known;

adding to each packet sneering the network via an ingress virtual port the respective egress address assigned to that packet to provide a corresponding encapsulated packet;

without establishing a connection through the network for routing the packet, routing the encapsulating packet across the network according to the assigned respective added egress address encapsulated to the packet from the ingress virtual port to at least one agree virtual port associated with the assigned egress address, said routing being restricted to virtual ports belonging to the distinct set of virtual ports which includes the ingress virtual port; and removing from each encapsulated packet received at an egress virtual port of the network, the egress address assigned to that packet to provide a decapsulated packet.

12. A method of routing packets through a network having a plurality of distinct sets of virtual ports, no virtual port belonging to more than one of the distinct sets, a respective distinct broadcast address being assigned to each distinct set of virtual ports the method comprising:

assigning a respective egress address to each packet entering the network via an ingress virtual port, the respective egress address corresponding to a respective destination address of the packet when a correspondence between the destination address and an egress address is known, and the respective egress address being a broadcast egress address corresponding to the set comprising the ingress virtual port when no correspondence between the destination address and an egress address to known;

adding to each packet entering the network via an ingress virtual port the respective egress address assigned to that packet to provide a corresponding encapsulated packet;

assigning a respective ingress address to each packet entering the network, the respective ingress address corresponding to the ingress virtual port via which the packet enters the network;

adding the assigned ingress address to each packet entering the network in providing the corresponding encapsulated packet; and maintaining an address association table associated with each virtual port of the network, each address association table mapping each of a plurality of egress addresses to at least one corresponding destination address; and using the address association tables to determine correspondences between destination addresses and egress addresses routing the encapsulated packet in the network according to the respective added egress address encapsulated in the packet, said routing being restricted to virtual ports belonging to the distinct set of virtual ports which includes the ingress virtual port; and removing from each encapsulated packet received at an egress virtual port the egress address assigned to that packet to provide a decapsulated packet, wherein;

on receipt of a packet entering the network via an ingress virtual port, said packet including a source address, an entry is added to the address association table associated with said ingress virtual port when said address association table does not contain the source address in any destination address field of said address association table, said entry comprising the source address in a destination address field and the ingress address in a corresponding egress address field; and on receipt of an encapsulated packet at a virtual port of the network, said encapsulated packet including a source address and an ingress address, an entry is added to the address association table associated with said virtual port when said address association table does not contain the source address in any destination address field of said address association table, said entry comprising the source address in a destination address field and the ingress address in a corresponding egress address field.

13. A connectionless communications network, comprising plural interconnected routing devices, each routing device comprising:

a plurality of distinct sets of virtual ports, no virtual port belonging to more than one of the distinct sets, and each distinct set being assigned a respective distinct broadcast address;

at least one address assigner operable to assign a respective egress address to each packet entering the network via an ingress virtual port, the respective egress address corresponding to a respective destination address of the entering packet when a correspondence between the destination address and an egress address is known, and the respective egress address being a broadcast egress address selected based an the ingress virtual port is correspond to the set comprising the ingress virtual port when no correspondence between the destination address and an egress address is known; and at least one router operable without establishing a connection through the network to route the packet according to the respective egress address, said routing being restricted to virtual ports belonging to the distinct set of virtual ports which includes the ingress virtual port, such that packets can be routed by plural successive routing devices according to egress addresses assigned where the packets enter the network.

14. A network as defined in claim 13, wherein, when the destination address of the packet is a unicast address and a correspondence between the destination address and a unicast egress address is known:
   each address assigner is operable to assign the unicast egress address, said unicast egress address corresponding to an egress virtual port belonging to the distinct set of virtual ports which includes the ingress virtual port, the destination address being accessible from said egress virtual port; and
   each router is operable to route the packet to said egress virtual port.

15. A network as defined in claim 13, wherein, when the destination address of the packet in a unicast address and no correspondence between the destination address and an egress address is known:
   each address assigner is operable to assign a broadcast egress address corresponding to the distinct set of virtual ports which includes the ingress virtual port; and
   each router is operable to route the packet to each virtual port, other than the ingress virtual port, of the distinct set of virtual ports which includes the ingress virtual port.

16. A network as defined in claim 13, wherein, when the destination address of the packet is a multicast address:
   each address assigner is operable to assign a broadcast egress address corresponding to the distinct set of virtual ports which includes the ingress virtual port; and
   each router is operable to route the packet to each virtual port of the distinct set of virtual ports which includes the ingress virtual port other than the ingress virtual port.

17. A network as defined in claim 13 wherein, when the destination address of the packet is a multicast address and a correspondence between the destination address and a multicast egress address is known:
   each address assigner is operable to assign the multicast egress address, said multicast egress address corresponding to a plurality of virtual ports belonging to the distinct set of virtual port which includes the ingress virtual port; and each router is operable to route the packet to each virtual port of said plurality of virtual ports belonging to the distinct set of virtual ports which includes the ingress virtual port.

18. A network as defined in claim 17, further comprising a plurality of trunks interconnecting routers of the network, wherein:
   each routed is operable to route the packet via trunks of the network; and
   where the packet is assigned a multicast egress address corresponding to a plurality of virtual ports in a distinct set of virtual ports, each router is operable to route the packet via a restricted set of trunks containing only those trunks required to reach virtual ports in the plurality of virtual ports corresponding to said multicast egress address.

19. A network as defined in claim 13, wherein each address assigner comprises an address association table and is operable:
   to assign a respective ingress address to each packet entering the network, the respective Ingress address corresponding to a virtual port via which the packet enters the network;
   to use assigned ingress addresses to populate the address association table; and
   to use the address association table to determine correspondences between destination addresses and egress addresses.

20. A network as defined in claim 13, further comprising a plurality of trunks interconnecting routers of the network, wherein:
   each router is operable to route the packet via trunks of the network; and
   when the packet is assigned a broadcast egress address corresponding to a distinct set of virtual ports, each router is operable to route the packet via a restricted set of trunks containing only those trunks required to roach virtual ports in the distinct set of virtual port corresponding to said broadcast egress address.

21. A network as defined in claim 13, wherein at least one physical port of the network maps one-to-one onto a corresponding virtual port of network, said physical port and said corresponding virtual port being associated with a respective distinct physical address.

22. A network as defined in claim 13, wherein at least one physical port of the network maps onto a corresponding plurality of virtual ports of the network, said physical port being associated with a respective distinct physical address, and each virtual port of said corresponding plurality of virtual ports being associated with a respective distinct combination of said physical address and a respective virtual network identifier.

23. A connectionless communications network, comprising:
   a plurality of distinct sets of virtual ports, no virtual port belonging to more than one of the distinct sets, and each distinct set being assigned a respective distinct broadcast address;
   at least one address assigner operable to assign a respective egress address to each packet entering the network via an ingress virtual port, to respective egress address corresponding to a respective destination address of the entering packet and designating an egress virtual port of the network when a correspondence between the destination address and an egress address is known, and the respective egress address being a broadcast address selected based on the ingress virtual port to correspond to the set comprising the ingress virtual port when no correspondence between the destination address and an egress address is known and comprising an encapsulator for adding to each packet entering the network via an ingress virtual port the respective egress address assigned to that packet to provide a corresponding encapsulated packet; and
   at least one router operable establishing a connection across the network to route the packet according to the assigned respective egress address encapsulated in the packet, said routing being restricted to virtual ports belonging to the distinct set of virtual ports which includes the ingress virtual port; and
   a decapsulator for removing from each encapsulated packet received at an egress virtual port of the network the egress address assigned to that packet on entering the network to provide a decapsulated packet.

24. A communications network, comprising:
   a plurality of distinct sets of virtual ports, no virtual port belonging to more than one of the distinct sets, and each distinct set being assigned a respective distinct broadcast address;

at least one address assigner operable:
  to assign a respective egress address to each packet entering the network via an ingress virtual port, the respective egress address corresponding to a destination address of the entering packet when a correspondence between the destination address and an egress address is known, and the respective egress address being a broadcast address corresponding to the set comprising the ingress virtual port when no correspondence between the destination address and an egress address is known and comprising an encapsulator for adding to each packet entering the network via an ingress virtual port the respective egress address assigned to that packet to provide a corresponding encapsulated packet;
  to assign a respective ingress address to each packet entering the network, the respective Ingress address corresponding to the ingress virtual port via which the packet enters the network;
to add the assigned ingress address to each packet entering the network in providing the corresponding encapsulated packet;
to maintain an address association table, the address association table mapping each egress address of a plurality of egress addresses to at least one corresponding destination address; and
to use the address association table to determine correspondences between destination addresses end egress addresses, wherein:
on receipt of a packet entering the network via an ingress virtual port corresponding to an ingress address, said packet including a source address, the address assigner is operable to add an entry to the address association table associated with said ingress virtual port when address association table does not contain the source address in any destination address field of the address association table, said entry comprising the source address in a destination address field and the ingress address in a corresponding egress address field; and
on receipt of an encapsulated packet at a virtual port of the network, said encapsulated packet including a source address and an ingress address, the address assigner is operable to add an entry to the address association table associated with said virtual port when said address association table does not contain the source address in any destination address field of said address association table, said entry comprising the source address in a destination address field and the ingress address in a corresponding egress address field;
at least one router operable to route the packet according to the respective egress address, said routing being restricted to virtual ports belonging to the distinct set of virtual ports which includes the ingress virtual port; and
a decapsulator for removing from each encapsulated packet received at an egress virtual port of the network the egress address assigned to that packet to provide a decapsulated packet.

25. A routing device for a communications network, the routing device comprising:
  a plurality of distinct subsets of virtual ports, no virtual port belonging to more than one of the distinct subsets, and each distinct subset being a subset of a respective distinct set of virtual ports of the network and each distinct set being assigned a respective distinct broadcast address;
  at least one address a assigner operable to assign a respective egress address to each packet entering the network via an ingress virtual port, the respective egress address corresponding to a respective destination address of the entering packet and an egress virtual port of the network when a correspondence between the destination address and an egress address is known, and the respective egress address being a broadcast address selected based on the ingress virtual port to correspond to the set comprising the ingress virtual port when no correspondence between the destination address and an egress address is known; and comprising a packet modifier for adding to each packet entering the network via an ingress virtual port the respective egress address assigned to that packet to provide a corresponding modified packet;
  at least one router operable without establishing a connection across the network to route the packet according to the respective egress address added to the modified packet, said routing being restricted to virtual ports belonging to the distinct set of virtual ports which includes the ingress virtual port; and
  a packet restorer for removing from each modified packet received at an egress virtual port of the network the egress address assigned to that packet on entering the network to provide a restored packet.

26. A routing devise as defined in claim 25, wherein, when the destination address of the packet is a unicast address and a correspondence between the destination address and a unicast egress address is known;
  each address assigner is operable to assign the unicast egress address, said unicast egress address corresponding to an egress virtual port belonging to the distinct set of virtual ports which induces the ingress virtual port, the destination address being accessible from said egress virtual port; and
  each router is operable to route the packet to said egress virtual port.

27. A routing device as defined in claim 25, wherein, when the destination address of the packet is a unicast address and no correspondence between the destination address and an egress address is known:
  each address assigner is operable to assign a broadcast egress address corresponding to the distinct set of virtual ports which includes the ingress virtual port; and
  each router is operable to route the packet to each virtual port of the distinct set of virtual ports which includes the ingress virtual port other than the ingress virtual port.

28. A routing device as defined in claim 25, wherein, when the destination address of the packet is a multicast address:
  each address assigner is operable to assign a broadcast egress address corresponding to the distinct set of virtual ports which includes the ingress virtual port; and
  each router is operable to route the packet to each virtual port of the distinct set of virtual ports which includes the ingress virtual port other than the ingress virtual port.

29. A routing device as defined in claim 25, wherein, when the destination address of the packet is a multicast address end a correspondence between the destination address and a multicast egress address is known:
  each address assigner is operable to assign the multicast egress address, said multicast egress address corresponding to a plurality of virtual parts belonging to the distinct set of virtual ports which includes the ingress virtual port; and each router is operable to route the packet to each virtual port of said plurality of virtual ports belonging to the distinct set of virtual ports which includes the ingress virtual port.

30. A routing device as defined in claim 29, wherein:
each router is operable to route the packet via trunks of the network; and
when the packet is assigned a multicast egress address corresponding to a plurality of virtual ports in a distinct set of virtual ports, each router is operable to route the packet via a restricted set of trunks containing only those trunks required to reach virtual ports in the plurality of virtual ports corresponding to said multicast egress address.

31. A routing device as defined in claim 25, wherein each address assigner comprises an address association table and is operable:
to assign a respective ingress address to each packet entering the network, the respective ingress address corresponding to a virtual port via which the packet enters the network;
to use assigned ingress addresses to populate the address association table; and
to use the address association table to determine correspondences between destination addresses and egress addresses.

32. A routing device as defined in claim 25, wherein:
each router is operable to route the packet via trunks of the network; and
when the packet is assigned a broadcast egress address corresponding to a distinct set of virtual ports, each router is operable to route the packet via a restricted set of trunks containing only those trunks required to reach virtual ports in the distinct set of virtual ports corresponding to said broadcast egress address.

33. A routing device as defined in claim 25, wherein at least one physical port of the routing device maps one-to-one onto a corresponding virtual port of routing device, said physical port and said corresponding virtual port being associated with a respective distinct physical address.

34. A routing device as defined in claim 25, wherein at least one physical port of the routing device maps onto a corresponding plurality of virtual ports of the routing device, said physical port being associated with a respective distinct physical address, and each virtual port of said corresponding plurality of virtual ports being associated with a respective distinct combination of said physical address and a respective virtual network identifier.

35. A routing device for a communications network, the routing device comprising:
a plurality of distinct subsets of virtual ports, no virtual port belonging to more than one of the distinct subsets, and each distinct subset being a subset of a respective distinct set of virtual ports of the network and each distinct set being assigned a respective distinct broadcast address;
at least one address assigner operable to assign a respective egress address to each packer entering the network via an ingress virtual port the respective egress address corresponding to a respective destination address of the entering packet and an egress virtual port of the network when a correspondence between the destination address and an egress address is known, and the respective egress address being a broadcast address corresponding to the set comprising the ingress virtual port when no correspondence between the destination address and an egress address is known; and comprising an encapsulator for adding to each packet entering the network via an ingress virtual port the respective egress address assigned to that packet to provide a corresponding encapsulated packet;
at least one router operable without establishing a connection across the network to route the packet according to the assigned respective egress address encapsulated in the packet, said routing being restricted to virtual ports belonging to the distinct set of virtual ports which includes the ingress virtual port; and
a decapsulator for removing from each encapsulated packet received at an egress virtual port of the network the egress address assigned to that packet on entering the network to provide a decapsulated packet.

36. A routing device for a communications network, the routing device comprising:
a plurality of distinct subsets of virtual ports, no virtual port belonging to more than one of the distinct subsets, each subset being a subset of a respective distinct set of virtual ports of the network and each distinct set being assigned a respective distinct broadcast address;
at least one address assigner operable:
to assign a respective egress address to each packet entering the network via an ingress virtual port, the respective egress address corresponding to a destination address of the entering packet when a correspondence between the destination address and an egress address is known, and the respective egress address being a broadcast address corresponding to the set comprising the ingress virtual port when no correspondence between the destination address and an egress address is known;
to assign a respective ingress address to each packet entering the network, the respective ingress address corresponding to the ingress virtual port via which the packet enters the network;
to add the assigned ingress address to each packet entering the network in providing the corresponding encapsulated packet;
to maintain an address association table, the address association table mapping each of a plurality of egress addresses to at least one corresponding destination address; and
to use the address association table to determine correspondences between destination addressee and egress addresses, wherein:
on receipt of a packet entering the network via a virtual port associated with an ingress address, said packet including a source address, the address assigner is operable to add an entry to the address association table associated with said ingress virtual port when the address association table does not contain the source address in any destination address field of the address association table, said entry comprising the source address in a destination address field and the ingress address in a corresponding egress address field; and
on receipt of an encapsulated packet via of virtual port of the network, said encapsulated packet including a source address and an ingress address, the address assigner is operable to add an entry to the address association table associated with said virtual port when said address association table does not contain the source address in any destination address field of said address association table, said entry comprising the source address in a destination address field and the ingress address in a corresponding egress address field;

at least one router operable to route the packet according to the respective egress address, said routing being restricted to virtual ports belonging to the distinct set of virtual ports which includes the ingress virtual port; and a decapsulator for removing from each modified packet received at an egress virtual port of the network the egress address assigned to that packet to provide a decapsulated packet.

37. A routing device as defined in claim 36, wherein each router provides IEEE 802.1 switching functionality adopted to packets encapsulated with ingress and egress addresses.

38. A routing device for a connectionless communications network comprising:

a plurality of distinct subsets of virtual ports, no virtual port belonging to more than one of the distinct subsets, each distinct subset being a subset of a respective distinct set of virtual ports of the network and each distinct set being assigned a respective distinct broadcast address;

a respective address assigner for each distinct subset of virtual ports, each address assigner being connected to its respective distinct subset of virtual ports and being operable:

to assign a respective egress address to each packet entering the network via an ingress virtual port of the routing device, the respective egress address corresponding to a respective destination address of the entering packet when a correspondence between the destination address and an egress address is known, and the respective egress address being a broadcast egress address selected based on the ingress virtual port to correspond to the set comprising the ingress virtual port when no correspondence between the destination address and an egress address is known; and to assign a respective ingress address to each packet entering the network, the respective ingress address corresponding to the ingress virtual port via which the packet enters the network;

each address assigner comprising:

an encapsulator for adding to each packet entering the network via an ingress virtual port the respective egress address and the respective ingress address assigned to that packet to provide a corresponding encapsulated packet; and a decapsulator for removing from each encapsulated packet received at an egress virtual port of the network the egress address assigned to that packet to provide a decapsulated packet; and at least one router connected to the address assigners and operable without establishing a connection across the network to route the packet according to the egress address, said routing being restricted to virtual ports belonging to the distinct set of virtual ports which includes the ingress virtual port.

39. A routing device as defined in claim 38, further comprising a switching element connected between at least one address assigner and its respective distinct subset of virtual ports, said switching element being operable to multiplex the virtual ports of the respective distinct subset of virtual ports onto the address assigner.

40. A routing device as defined in claim 39, wherein:

each switching element provides IEEE 802.1 switching functionality; and each router provides IEEE 802.1 switching functionality adapted to packets encapsulated with ingress and egress addresses.

41. A routing device comprising:

a plurality of distinct subsets of virtual ports, no virtual port belonging to more than one of the distinct subsets, each distinct subset being a subset of a respective distinct set of virtual ports of the network and each distinct set being assigned a respective distinct broadcast address;

a respective address assigner for each distinct subset of virtual ports, each address assigner being connected to its respective distinct subset of virtual ports and being operable;

to assign a respective egress address to each packet entering the network via an ingress virtual port of the routing device, the respective egress address corresponding to a respective destination address of the entering packet when a correspondence between the destination address and an egress address is known, and the respective egress address being a broadcast egress address corresponding to the set comprising the ingress virtual port when no correspondence between the destination address and an egress address is known; and to assign a respective ingress address to each packet entering the network, the respective ingress address corresponding to the ingress virtual port via which the packet enters the network;

each address assigner comprising:

an encapsulator for adding to each packet entering the network via an ingress virtual port the respective egress address and the respective ingress address assigned to that packet to provide a corresponding encapsulated packet; and a decapsulator for removing from each encapsulated packet received at an egress virtual port of the network the egress address assigned to that packet to provide a decapsulated packet; and at least one router connected to the address assigners and operable to route the packet according to the egress address, said routing being restricted to virtual ports belonging to the distinct set of virtual ports which includes the ingress virtual port, and a plurality of VLAN demultiplexers connected to the router, each VLAN demultiplexer being connected between the router and a respective plurality of the address assigners, each VLAN demultiplexer being associated with a respective egress address and being operable to route an encapsulated packet from the router to an address assigner associated with the ingress address of the encapsulated packet such that all encapsulated packets having a common egress address and an ingress address corresponding to a virtual port in a particular set of the distinct sets of virtual ports ere router to an address assigner associated with that egress address and that particular distinct set of virtual ports.

42. A routing device as defined in claim 41, further comprising:

a respective VLAN translator connected to each address assigner that is connected to the VLAN demultiplexer, each VLAN translator being operable to apply a respective VLAN identifier to packets received from its respective address assigner; and a router demultiplexer connected to a plurality of the VLAN translators for routing packets received from an external router to a VLAN translator selected according to VLAN identifiers of the packets received from the external router.

43. A routing device as defined in claim 41, further comprising a respective virtual private router connected to each address assigner that is connected to a VLAN demultiplexer.

44. A routing device as defined in claim 43, further comprising a respective network address translator connected to each virtual private router for translating addresses between a respective first address space used by its virtual private router and a second address space used by an Internet router.

45. A routing device as defined in claim 44, further comprising an Internet router connected to the network address translators.

46. A routing device as defined in claim 41, further comprising:
   an MPLS switch, the MPLS switch being operable to route packets between an Internet router and address assigners selected according to MPLS labels of the packets; and
   a respective MPLS converter connected between each address assigner that is connected to a VLAN demultiplexer and the MPLS switch, each MPLS converter:
      being operable to apply a respective MPLS label to each packet received from its respective address assigner, said MPLS label being uniquely associated with the MPLS converter; and
      being operable to remove MPLS labels from packets received from the MPLS switch.

47. A method of routing packets through a connectionless communications network having a plurality of distinct sets of virtual ports, no virtual port belonging to more than one of the distinct sets, a respective distinct broadcast address being assigned to each distinct set of virtual ports, the method comprising:
   assigning a respective egress address to each packet entering the network via an ingress virtual port, the respective egress address corresponding to a respective destination address of the entering packet when a correspondence between the destination address and an egress address is known, and the respective egress address being a broadcast address selected based on the ingress virtual port to correspond to the set comprising the ingress virtual port when no correspondence between the destination address and an egress address is known;
   routing the packet according to the respective egress address without establishing a connection across the network, said routing being restricted to virtual ports belonging to the distinct set of virtual ports which includes the ingress virtual port; and
   routing an encapsulated packet received from the network to an address assigner selected according to the ingress address and the egress address of the encapsulated packet such that all encapsulated packets having a common egress address and an ingress address corresponding to a virtual port in a particular set of the distinct sets of virtual ports are routed to an address assigner associated with that egress address and that particular distinct set of virtual ports.

48. A method as defined in claim 47, further comprising:
   applying a respective VLAN identifier to packets leaving the network from a respective address assigner; and
   routing packets received from an external router to an address assigner selected according to VLAN identifiers of the packets received from the external router.

49. A method as defined in claim 47, further comprising:
   applying a respective MPLS label to packets leaving the network from an address assigner, said MPLS label being uniquely associated with said address assigner;
   routing packets between an Internet router and address assigners according to MPLS labels of the packets; and
   removing MPLS labels from packets received from the Internet router.

50. A method as defined in claim 47, further comprising,
   applying a respective identifier to packets leaving the network from an address assigner, said identifier being uniquely associated with said address assigner; and
   routing packets into and out of the network according to their respective identifiers.

51. A method of routing packets from a first customer VLAN segment through a connectionless service provider network having a plurality of distinct sets of virtual ports to a second customer VLAN segment, no virtual port belonging to more then one of the distinct sets, a respective distinct broadcast address being assigned to each distinct set of virtual ports, the method comprising:
   assigning a respective egress address of the service provider network to each customer LAN packet entering the service provider network from the first customer VLAN segment via an ingress virtual port, the respective egress address corresponding to a respective destination address of the customer LAN packet and designating an egress virtual port of the service provider network when a correspondence between the destination address and an egress address is known, and the respective egress address being a broadcast egress address of the service provider network selected based on the ingress virtual port to correspond to the set of virtual ports of the service provider network comprising the ingress virtual port when no correspondence between the destination address and an egress address is known;
   adding to each customer LAN packet entering the service provider network via an ingress virtual port the respective egress address assigned to that packet to provide a corresponding service provider network packet;
   without establishing a connection across the service provider network, routing the service provider network packet across the service provider network according to the respective added egress address from the ingress virtual port to at least one egress virtual port associated with the assigned egress address, said routing being restricted to virtual ports belonging to the distinct set of virtual ports which includes the ingress virtual port; and
   removing from each service provider network packet received at an egress virtual port of the service provider network the egress address assigned to that packet to provide a restored customer LAN packet for communication to the second customer VLAN segment.

52. A method as defined in claim 51, further comprising:
   assigning a respective service provider network ingress address to each customer LAN packet entering the service provider network, the respective ingress address designating a virtual port of the service provider network via which the customer LAN packet enters the service provider network;
   adding the assigned ingress address to customer LAN packet in providing the corresponding service provider network packet;
   using the assigned ingress address to populate address association tables at nodes of the service provider network traversed by the service provider network packet; and using the address association tables to determine correspondences between destination addresses of the customer LAN segments and egress addresses of the service provider network.

53. A connectionless service provider communications network for interconnecting customer LAN segments, the service provider network comprising plural interconnected routing devices, each routing device comprising:

a plurality of distinct sets of virtual ports, no virtual port belonging to more than one of the distinct sets, and each distinct set being assigned a respective distinct broadcast address;

at least one address assigner operable to assign a respective egress address to each customer LAN packet entering the service provider network from a customer LAN segment via an ingress virtual port, the respective egress address corresponding to a destination address of the entering customer LAN packet and designating an egress virtual port of the service provider network when a correspondence between the destination address and an egress address of the service provider network is known, and the respective egress address being a broadcast address selected based on the ingress virtual port to correspond to the set comprising the ingress virtual port when no correspondence between the destination address and an egress address is known; and at least one router operable without establishing a connection across the service provider network to route the packet according to the respective egress address, said routing being restricted to virtual ports of the service provider network belonging to the distinct set of virtual ports which includes the ingress virtual port, such that packets can be routed by plural successive routing devices according to egress addresses assigned where the packets enter the service provider network.

54. A network as defined in claim 53, wherein each address assigner comprises an address association table and is operable:

to assign a respective ingress address to each customer LAN packet entering the service provider network, the respective ingress address designating a virtual port of the service provider network via which the packet enters the service provider network;

to use assigned ingress addresses to populate the address association table; and to use the address association table to determine correspondences between destination addresses of customer LAN packets and egress addresses of the service provider network.

55. A routing device for a connectionless service provider network for interconnecting customer LAN segments, the routing device comprising:

a plurality of distinct subsets of virtual ports, no virtual port belonging to more than one of the distinct subsets, each subset being a subset of a respective distinct set of virtual ports of the service provider network and each distinct set being assigned a respective distinct broadcast address of the service provider network;

at least one address assigner operable to assign a respective egress address of the service provider network to each customer LAN packet entering the service provider network from a customer LAN segment via an ingress virtual port of the routing device, the respective egress address corresponding to a destination address of the entering customer LAN packet and an egress virtual port of the service provider network when a correspondence between the destination address and an egress address of the service provider network is known, and the respective egress address being a broadcast address of the service provider network selected based on the ingress virtual port to correspond to the set comprising the ingress virtual port when no correspondence between the destination address of the customer LAN packet and an egress address of the service provider network is known; and at least one router operable without establishing a connection across the service provider network to route the packet according to the respective egress address said routing being restricted to virtual ports of the service provider network belonging to the distinct set of virtual ports which includes the ingress virtual port.

56. A routing device as defined in claim 55, wherein the address assigner comprises an address association table and is operable:

to assign a respective ingress address to each customer LAN packet entering the service provider network, the respective ingress address designating a virtual port of the service provider network via which the packet enters the service provider network;

to use assigned ingress addresses to populate the address association table; and to use the address association table to determine correspondences between destination addresses of customer LAN packets and egress addresses of the service provider network.

* * * * *